US012711906B2

(12) United States Patent
Yang

(10) Patent No.: US 12,711,906 B2
(45) Date of Patent: Aug. 18, 2026

(54) DISPLAY APPARATUS AND DRIVING METHOD THEREOF

(71) Applicant: LG Display Co., Ltd., Seoul (KR)

(72) Inventor: Hyun Jeong Yang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/003,825

(22) Filed: Dec. 27, 2024

(65) Prior Publication Data

US 2026/0120620 A1 Apr. 30, 2026

(30) Foreign Application Priority Data

Feb. 27, 2024 (KR) ........................ 10-2024-0028330

(51) Int. Cl.

| | |
|---|---|
| ***G09G 3/32*** | (2016.01) |
| ***G09G 3/3208*** | (2016.01) |
| ***G09G 3/3233*** | (2016.01) |
| ***G09G 3/3266*** | (2016.01) |
| *G09G 3/325* | (2016.01) |

(52) U.S. Cl.

CPC ............. *G09G 3/32* (2013.01); *G09G 3/3208* (2013.01); *G09G 3/3233* (2013.01); *G09G 3/3266* (2013.01); *G09G 3/325* (2013.01); *G09G 2300/0426* (2013.01); *G09G 2300/0842* (2013.01); *G09G 2320/0257* (2013.01); *G09G 2358/00* (2013.01); *G09G 2380/10* (2013.01)

(58) Field of Classification Search

CPC ...... G09G 3/32; G09G 3/3208; G09G 3/3233; G09G 3/325; G09G 3/3266; G09G 2300/0426; G09G 2300/0842; G09G 2320/0257; G09G 2358/00; G09G 2380/10

See application file for complete search history.

(56) References Cited

U.S. PATENT DOCUMENTS

| | | | |
|---|---|---|---|
| 7,545,352 | B2 | 6/2009 | Kwak et al. |
| 7,773,056 | B2 | 8/2010 | Kwak et al. |
| 9,978,307 | B2 | 5/2018 | Yang |

(Continued)

FOREIGN PATENT DOCUMENTS

| | | | |
|---|---|---|---|
| KR | 10-0590068 | B1 | 6/2006 |
| KR | 10-0739318 | B1 | 7/2007 |
| KR | 10-2196908 | B1 | 12/2020 |

OTHER PUBLICATIONS

English Translation for JP 2023114122A, Inventor Takayuki Ohira, applicant Ohira Giken KK and publication on Aug. 17, 2023. (Year: 2023).*

*Primary Examiner* — William Boddie
*Assistant Examiner* — Saifeldin E Elnafia
(74) *Attorney, Agent, or Firm* — Fenwick & West LLP

(57) ABSTRACT

A display apparatus presented herein includes a subpixel including a driving transistor and at least two light emitting devices, a display panel including a first display area and a second display area, each of the first display area and the second display area displaying an image based on light emitted from the subpixel, and a display panel driving circuit configured to drive the display panel, wherein the display panel operates in a first driving mode during which one of the at least two light emitting devices emits light, and display panel operates in a second driving mode during which the at least two light emitting devices emit light.

12 Claims, 15 Drawing Sheets

SP

(56) References Cited

U.S. PATENT DOCUMENTS

| | | | | |
|---|---|---|---|---|
| 2006/0022909 | A1* | 2/2006 | Kwak | G09G 3/3233 345/76 |
| 2006/0114193 | A1 | 6/2006 | Kwak et al. | |
| 2011/0284881 | A1* | 11/2011 | Shikina | H10K 59/879 257/E27.121 |
| 2016/0019844 | A1 | 1/2016 | Yang | |
| 2022/0399529 | A1* | 12/2022 | Shin | G09G 3/3275 |
| 2024/0420640 | A1* | 12/2024 | Hwang | G09G 3/32 |

* cited by examiner

FIG. 16

| Signal | | A | B | C | D |
|---|---|---|---|---|---|
| Share mode | S_VS | L | L | L | H |
| | S_HS | L | L | L | H |
| Privacy mode | P_VS | H | L | L | L |
| | P_HS | H | L | L | L |

DISPLAY APPARATUS AND DRIVING METHOD THEREOF

CROSS-REFERENCE TO RELATED APPLICATION

This application claims priority from Republic of Korea Patent Application No. 10-2024-0028330, filed on Feb. 27, 2024, which is hereby incorporated by reference in its entirety.

BACKGROUND

Field

The present disclosure relates to a display apparatus and a driving method thereof.

Discussion of Related Art

As information technology advances, the market for display apparatuses which are connection mediums connecting a user with information is growing. Therefore, the use of display apparatuses such as light emitting display apparatuses, quantum dot display (QDD) apparatuses, and liquid crystal display (LCD) apparatuses is increasing.

The display apparatuses described above include a display panel which includes a plurality of subpixels, a driver which outputs a driving signal for driving the display panel, and a power supply which generates power which is to be supplied to the display panel or the driver.

In such display apparatuses, when the driving signal (for example, a scan signal and a data signal) is supplied to each of the subpixels provided in the display panel, a selected subpixel may transmit light or may self-emit light, and thus, an image may be displayed.

SUMMARY

To overcome the aforementioned problem of the related art, the present disclosure may provide a display apparatus and a driving method thereof, which may divide a driving current when at least two light emitting devices emit light and may thus implement high luminance and decrease a stress applied to a device to reduce a degradation and decrease the degree of recognition of an afterimage, thereby enabling a long lifetime.

To achieve these objects and other advantages and in accordance with the purpose of the disclosure, as embodied and broadly described herein, a display apparatus includes a subpixel including a driving transistor and at least two light emitting devices, a display panel including a first display area and a second display area, each of the first display area and the second display area displaying an image based on light emitted from the subpixel, and a display panel driving circuit configured to drive the display panel, wherein the display panel operates in a first driving mode during which one of the at least two light emitting devices emit light, and wherein the display panel operates in a second driving mode during which the at least two light emitting devices emit light.

A driving current generated from the driving transistor may be distributed to the at least two light emitting devices in the second driving mode.

The second driving mode may start based on a share signal applied through a share signal line and a privacy signal applied through a privacy signal line, each of the share signal line and the privacy signal line is connected to the subpixel.

The display panel driving circuit may include a level shifter circuit that outputs the share signal and the privacy signal.

The subpixel may include a plurality of mode selection transistors that selectively drive one or two of the at least two light emitting devices.

The plurality of mode selection transistors may include a first direction share mode selection transistor that is turned on based on a first direction share signal applied through a first direction share signal line, the first direction share mode selection transistor applying a driving current generated from the driving transistor to an anode electrode of a first light emitting device of the at least two light emitting devices, a second direction share mode selection transistor that is turned on based on a second direction share signal applied through a second direction share signal line, the second direction share mode selection transistor applying the driving current to the anode electrode of the first light emitting device, a second direction privacy mode selection transistor that is turned on based on a second direction privacy signal applied through a second direction privacy signal line, the second direction privacy mode selection transistor outputting the driving current, and a first direction privacy mode selection transistor that is turned on based on a first direction privacy signal applied through a first direction privacy signal line, the first direction privacy mode selection transistor applying the driving current that was output from the second direction privacy mode selection transistor to an anode electrode of a second light emitting device of the at least two light emitting devices.

The second driving mode may start when the first direction share signal, the second direction share signal, the second direction privacy signal, and the first direction privacy signal are applied under a same voltage condition.

The subpixel may include the driving transistor including a gate electrode connected to a first node of the subpixel, a first electrode connected to a second node of the subpixel, the second node connected to a high-level voltage line, and a second electrode connected to a third node of the subpixel, a first switching transistor including a gate electrode connected to a first scan line and a first electrode connected to a data line, a capacitor including a first electrode connected to a second electrode of the first switching transistor and a second electrode connected to the first node, a second switching transistor including a gate electrode connected to a second scan line, a first electrode connected to the first node, and a second electrode connected to the third node, a third switching transistor including a gate electrode connected to an emission control line, a first electrode connected to a reference voltage line, and a second electrode connected to the first electrode of the capacitor, a fourth switching transistor including a gate electrode connected to the emission control line, a first electrode connected to the third node, a fifth switching transistor including a gate electrode connected to the second scan line, a first electrode connected to the reference voltage line, and a second electrode connected to an anode electrode of a first light emitting device of the at least two light emitting devices, a sixth switching transistor including a gate electrode connected to the second scan line, a first electrode connected to the reference voltage line, and a second electrode connected to an anode electrode of a second light emitting device of the at least two light emitting devices, a seventh switching transistor including a gate electrode connected to a first direction share signal line, a first electrode connected to a second electrode of the fourth switching transistor, and a second electrode connected to the anode electrode of the first light emitting device, an eighth switching transistor including a gate electrode connected to a second direction share signal line, a first electrode connected to the second electrode of the fourth switching transistor, and a second electrode connected to the anode electrode of the first light emitting device, a ninth switching transistor including a gate electrode connected to a second direction privacy signal line and a first electrode connected to the second electrode of the fourth switching transistor, and a tenth switching transistor including a gate electrode connected to a first direction privacy signal line, a first electrode connected to a second electrode of the ninth switching transistor, and a second electrode connected to the anode electrode of the second light emitting device.

The display panel driving circuit may include a controller configured to generate, based on a first signal applied from outside of the controller, a second signal that drives the display panel in at least one of the first driving mode and the second driving mode, and the controller may include a pixel position calculator circuit configured to calculate a position value of a boost pixel and set a region that operates in the second driving mode, a boost mode data generator circuit configured to generate, based on a position value of a boost pixel, a boost data signal corresponding to a region that operates in a boost mode of the display panel, and a pixel position selection signal generator circuit configured to generate, based on the position value of the boost pixel, a pixel position selection signal that selects a position of the boost pixel.

The display panel driving circuit may include a level shifter circuit that outputs, based on the pixel position selection signal, a share signal applied through a share signal line and a privacy signal applied through a privacy signal line, each of the share signal line and the privacy signal line is connected to the subpixel.

The first light emitting device may defined as a share light emitting device which enables all of a user of a first viewpoint and a user of a second viewpoint to see light emitted therefrom, and the second light emitting device is defined as a privacy light emitting device which enables only the user of the first viewpoint to see light emitted therefrom.

The boost data signal may generated so that luminance increases compared to a normal data signal generated in the first driving mode.

In one or more embodiments of the present disclosure, a driving method of a display apparatus includes operating a display panel of the display apparatus in a first driving mode during which one of two light emitting devices included in a subpixel of the display panel emits light, and operating the display panel in a second driving mode that is different from the first driving mode during which the two light emitting devices included in the subpixel emit light, wherein operating the display panel in the second driving mode starts based on a share signal applied through a share signal line and a privacy signal applied through a privacy signal line, each of the share signal line and the privacy signal line is connected to the subpixel of the display panel.

Operating the display panel in the second driving mode may start when the share signal and the privacy signal are applied under a same voltage condition.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 15 and 16 are diagrams for describing a region-based driving mode of a display panel according to the third embodiment of the present disclosure.

DETAILED DESCRIPTION

Hereinafter, the present disclosure will be described more fully with reference to the accompanying drawings, in which embodiments of the present disclosure are shown. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art.

A display apparatus according to the present disclosure may be implemented as a light emitting display apparatus or a quantum dot display (QDD) apparatus. Hereinafter, for convenience of description, a light emitting display apparatus self-emitting light based on an inorganic light emitting diode or an organic light emitting diode will be described for example.

Moreover, a thin film transistor (TFT) described below may be implemented with an n-type TFT, a p-type TFT, or a combination of an n-type TFT and a p-type TFT. A TFT may be a three-electrode element including a gate, a source, and a drain. The source may be an electrode which provides a carrier to a transistor. In the TFT, a carrier may start to flow from the source. The drain may be an electrode where the carrier flows from the TFT to the outside. That is, in the TFT, the carrier flows from the source to the drain.

In the p-type TFT, because a carrier is a hole, a source voltage may be higher than a drain voltage so that the hole flows from the source to the drain. In the p-type TFT, because the hole flows from the source to the drain, a current may flow from the source to the drain. On the other hand, in the n-type TFT, because a carrier is an electron, a source voltage may be lower than a drain voltage so that the electron flows from the source to the drain. In the n-type TFT, because the electron flows from the source to the drain, a current may flow from the drain to the source. However, a source and a drain of a TFT may switch therebetween based on a voltage applied thereto. Based thereon, in the following description, one of a source and a drain will be described as a first electrode, and the other of the source and the drain will be described as a second electrode.

Figure 1:
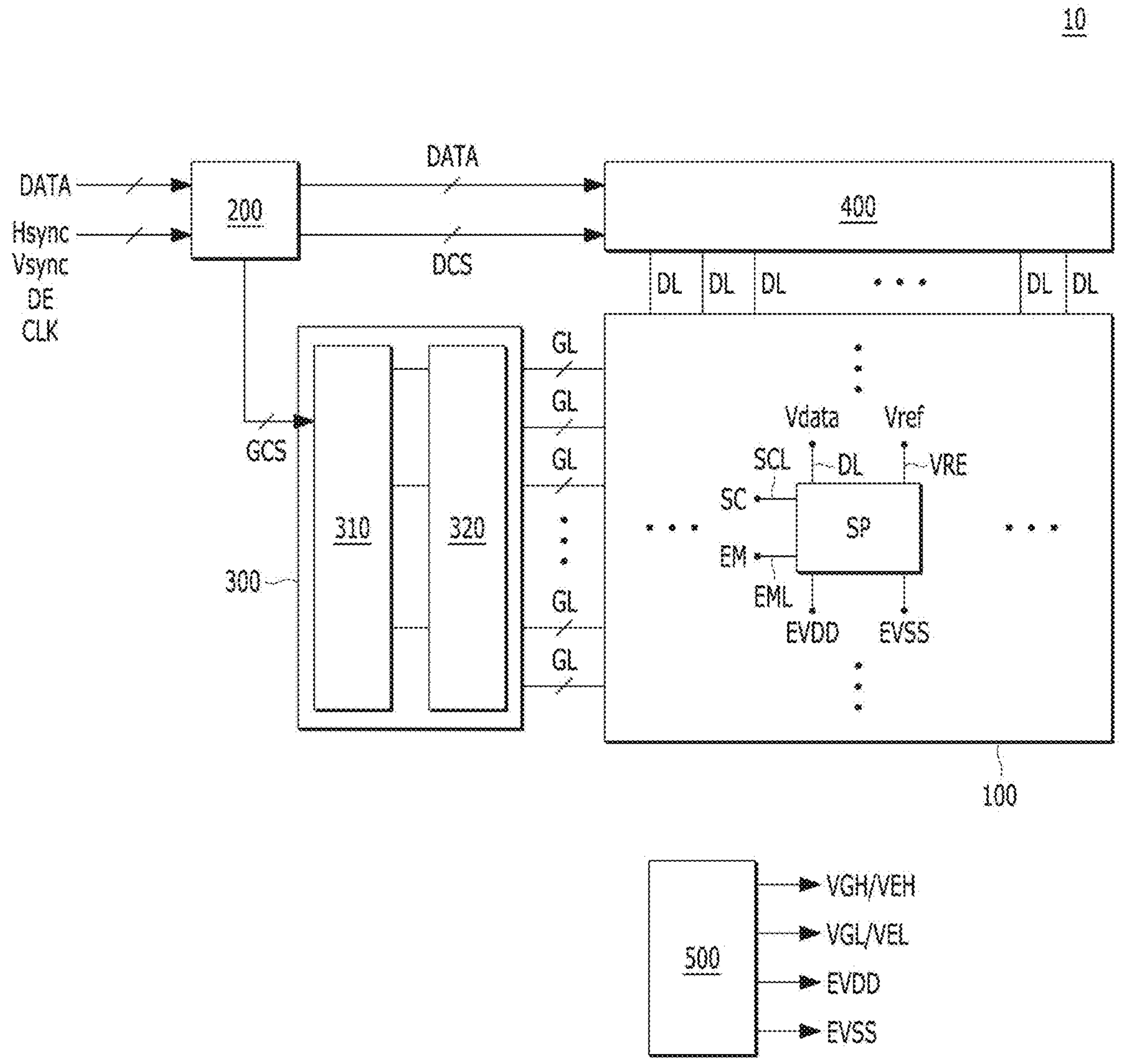
FIG. 1 is a block diagram schematically illustrating a display apparatus according to a first embodiment of the present disclosure.

FIG. 1 is a block diagram schematically illustrating a display apparatus 10 according to a first embodiment of the present disclosure.

As illustrated in FIG. 1, the display apparatus 10 may include a display panel 100 which includes a plurality of subpixels SP, a controller 200, a gate driver 300 which supplies a gate signal to the plurality of subpixels SP, a data driver 400 which supplies a data signal (or a data voltage) to the plurality of subpixels SP, and a power supply 500 which supplies power to the plurality of subpixels SP. The controller 200, the gate driver 300, the data driver 400, and the power supply 500 may be defined as a display panel driving circuit for driving the display panel 100. At least one of devices included in the display panel driving circuit may be integrated as one integrated circuit (IC).

The display panel 100 may include a display area (see AA of FIG. 2) where the plurality of subpixels SP are provided and a non-display area (see NA of FIG. 2) which is disposed to surround the display area AA and where the gate driver 300 and the data driver 400 are disposed. In the display panel 100, a plurality of gate lines GL and a plurality of data lines DL may intersect with one another, and each of the plurality of subpixels SP may be connected to a gate line GL and a data line DL. In detail, one subpixel SP may be supplied with a gate signal from the gate driver 300 through the gate line GL, may be supplied with a data signal from the data driver 400 through the data line DL, and may be supplied with a high-level voltage EVDD and a low-level voltage EVSS from the power supply 500.

The gate line GL may transfer a scan signal SC and an emission control signal EM to the plurality of subpixels SP, and the data line DL may transfer a data voltage Vdata to the plurality of subpixels SP. According to various embodiments, the gate line GL may include a plurality of scan lines SCL for supplying the scan signal SC and a plurality of emission control lines EML for supplying the emission control signal EM. The plurality of subpixels SP may be supplied with a reference voltage Vref through a reference line VRE.

Each of the plurality of subpixels SP may include a subpixel driving circuit. The subpixel driving circuit may include a plurality of switching elements, a driving element, and a capacitor. The switching element and the driving element may each be configured as a TFT. A switching transistor may be turned on based on the scan signal SC supplied through the scan line SCL and the emission control signal EM supplied through the emission control line EML. A driving transistor may control the amount of current supplied to a light emitting device OLED to adjust the amount of emitted light, based on the data voltage Vdata.

The display panel 100 may be implemented as a non-transmissive display panel or a transmissive display panel. The transmissive display panel may be applied to a transparent display apparatus which displays an image on a screen thereof and enables a real thing of a background to be seen. The display panel 100 may be implemented as a flexible display panel. The flexible display panel may use a plastic substrate. Each of the plurality of subpixels SP may be divided into a red subpixel, a green subpixel, and a blue subpixel for color implementation. Each of the plurality of subpixels SP may further include a white subpixel.

Touch sensors may be disposed in the display panel 100. A touch input may be sensed by using separate touch sensors, or may be sensed through the plurality of subpixels SP. The touch sensors may be arranged as an on-cell type or an add-on type in a screen of the display panel 100, or may be implemented as in-cell type touch sensors embedded in the display panel 100.

The controller 200 may process an image data signal DATA input from the outside to supply to the data driver 400, based on a size and a resolution of the display panel 100. The controller 200 may generate a gate control signal GDC and a data control signal DDC by using synchronization signals (for example, a dot clock signal CLK, a data enable signal DE, a horizontal synchronization signal Hsync, and a vertical synchronization signal Vsync) input from the outside. The controller 200 may supply the gate control signal GCS to the gate driver 300 to control an operation timing of the gate driver 300. The controller 200 may supply the data control signal DCS to the data driver 400 to control an operation timing of the data driver 400. The controller 200 may synchronize the operation timing of the gate driver 300 with the operation timing of the data driver 400 by using the gate control signal GCS and the data control signal DCS.

The controller 200 may be configured to be coupled to various processors (for example, a microprocessor, a mobile processor, and an application processor), based on a device mounted thereon. A host system disposed a previous end with respect to the controller 200 may be one of a television (TV) system, a set-top box, a navigation system, a personal computer (PC), a home theater system, a mobile device, a wearable device, and an automotive system.

The controller 200 may multiply an input frame frequency by i (where i may be a natural number) times to control an operation timing of the display panel driver, based on a frame frequency of an input frame frequency X i Hz. The input frame frequency may be about 60 Hz in national television standards committee (NTSC) scheme and may be about 50 Hz in phase-alternating line (PAL) scheme.

The controller 200 may driver the display panel 100 at various refresh rates. The controller 200 may drive the display panel 100 as a switchable type in a variable refresh rate (VRR) mode, namely, between a first refresh rate and a second refresh rate. For example, the controller 200 may simply change a speed of a clock signal, or may generate a synchronization signal so that a horizontal blank or a vertical blank occurs, or may drive the gate driver 300 in a mask mode, thereby driving the display panel 100 at various refresh rates.

A voltage level of the gate control signal GCS output from the controller 200 may be shifted to a gate on voltage VGL (VEL) and a gate off voltage VGH (VEH) by a level shifter (not shown) and may be supplied to the gate driver 300. The level shifter (e.g., level shifter circuit) may shift a low-level voltage of the gate control signal GCS to a gate low voltage VGL and may shift a high-level voltage of the gate control signal GCS to a gate high voltage VGH. The gate control signal GCS may include a start signal and a clock signal.

The gate driver 300 may supply the gate signal to the gate line GL, based on the gate control signal GCS supplied from the controller 200. The gate driver 300 may be disposed at one side or both sides of the display panel 100 in a gate in panel (GIP) type.

The gate driver 300 may sequentially output the gate signal to the plurality of gate lines GL, based on control by the controller 200. The gate driver 300 may shift the gate signal by using a shift register, and thus, may sequentially supply the signals to the gate lines GL.

In an organic light emitting display apparatus, the gate signal may include the scan signal SC and the emission control signal EM. The scan signal SC may include a scan pulse which swings between a gate on voltage VGL and a gate off voltage VGH. The emission control signal EM may include an emission control signal pulse which swings between a gate on voltage VEL and a gate off voltage VEH. The scan pulse may select subpixels SP of a line in which a data voltage Vdata is to be written. The emission control signal EM may define an emission time of each of the subpixels SP.

The gate driver 300 may include an emission control signal driver 310 and one or more scan drivers 320. The emission control signal driver 310 may output the emission control signal pulse in response to a start signal and a clock signal from the controller 200 and may sequentially shift the emission control signal pulse according to the clock signal. The one or more scan drivers 320 may output the scan pulse in response to the start signal (or a start pulse) and the clock signal (or a shift clock) from the controller 200 and may shift the scan pulse, based on a clock signal timing.

The data driver 400 may convert the image data signal DATA into a data voltage Vdata, based on the data control signal DCS supplied from the controller 200, and may output the data voltage Vdata through the data line DL.

In FIG. 1, it is illustrated that the data driver 400 is disposed as one type at one side of the display panel 100, but the number and arrangement positions of data drivers 400 are not limited thereto. That is, the data driver 400 may be configured with a plurality of integrated circuits (ICs) and may be provided in plurality, and the plurality of data drivers 400 may be divided and arranged at one side of the display panel 100.

The power supply 500 may generate a direct current (DC) power needed for driving of the display panel driver and a pixel array of the display panel 100 by using a DC-DC converter. The DC-DC converter may include a charge pump, a regulator, a buck converter, and a boost converter. The power supply 500 may receive a DC input voltage applied from the host system (not shown) to generate the gate on voltage VGL (VEL). The power supply 500 may generate DC voltages such as the gate off voltage VGH (VEH), a high-level voltage EVDD, and a low-level voltage EVSS. The gate on voltage VGL (VEL) and the gate off voltage VGH (VEH) may be supplied to the level shifter (not shown) and the gate driver 300. The high-level voltage EVDD and the low-level voltage EVSS may be supplied to the plurality of subpixels SP in common.

Figure 2:
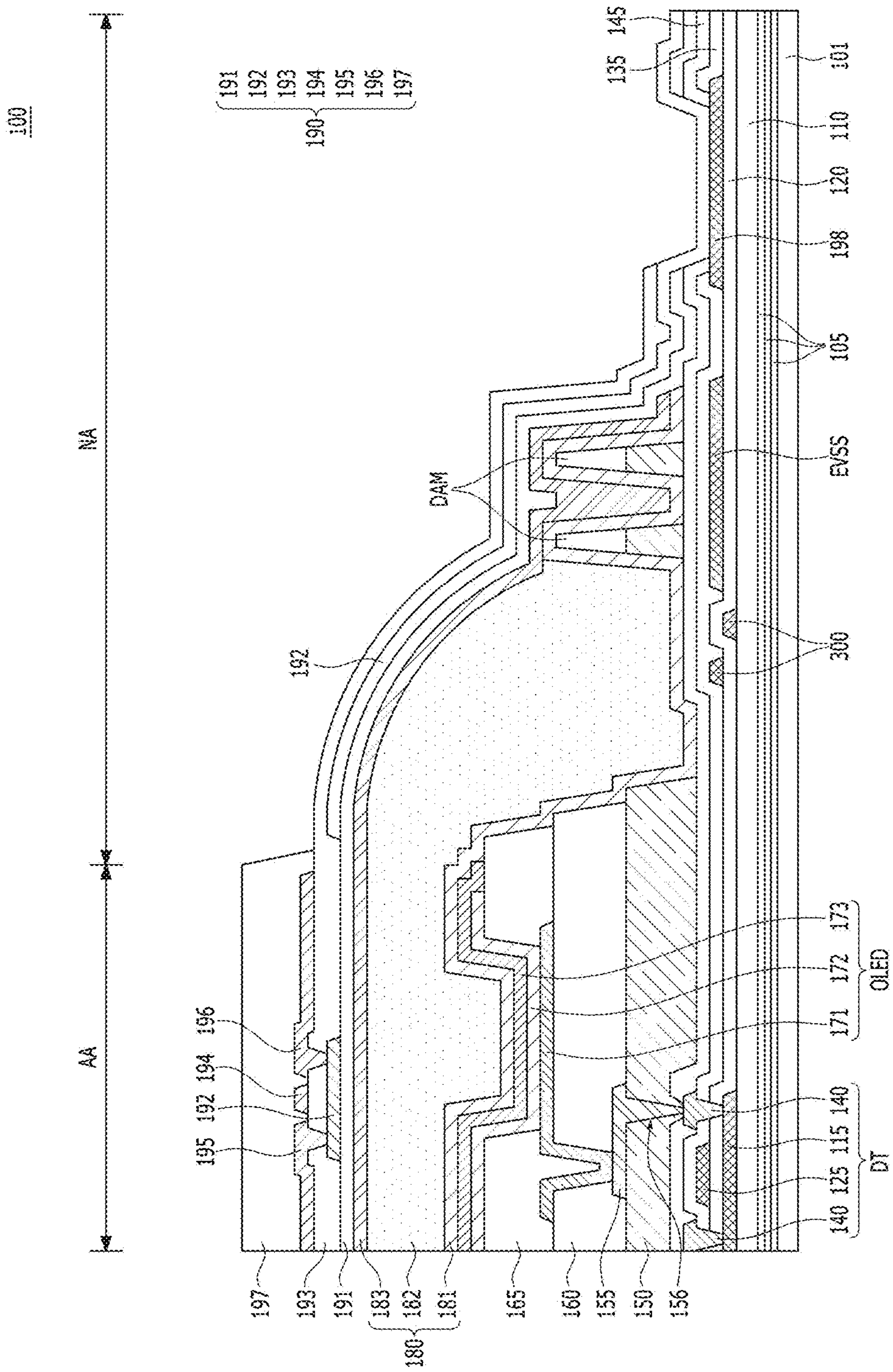
FIG. 2 is a cross-sectional view illustrating a stack type of a display panel according to the first embodiment of the present disclosure.

FIG. 2 is a cross-sectional view illustrating a stack type of a display panel according to the first embodiment of the present disclosure.

As illustrated in FIG. 2, a driving transistor DT for driving a light emitting device OLED disposed in a display area AA may be disposed on a substrate 101 of the display panel 100. The driving transistor DT may include a semiconductor layer 115, a gate electrode 125, and a source and drain electrode 140. For convenience of description, only the driving transistor DT of various TFTs included in a subpixel driving circuit is illustrated, but other TFTs such as a switching transistor may be included in the subpixel driving circuit. Also, in the present disclosure, the driving transistor DT may be described as having a coplanar structure, but a TFT may be implemented in another structure such as a staggered structure. Accordingly, embodiments of the present disclosure are not limited thereto.

At least a portion of the driving transistor DT and the switching transistor included in the subpixel driving circuit may use an oxide semiconductor as an active layer. A TFT which uses an oxide semiconductor material as the active layer may be good in leakage current cutoff effect and may be relatively lower in cost than a TFT which uses a polycrystalline semiconductor material as the active layer. Accordingly, in order to decrease power consumption and reduce the manufacturing cost, the subpixel driving circuit may at least one switching transistor and the driving transistor DT using an oxide semiconductor material.

All TFTs configuring the subpixel driving circuit may be implemented with an oxide semiconductor material, or only some switching transistors may be implemented with an oxide semiconductor material. However, a TFT using an oxide semiconductor material may be difficult to secure reliability, and a TFT using a polycrystalline semiconductor material may be high in speed and good in reliability. Accordingly, one or more embodiments of the present disclosure may include all of a switching TFT using an oxide semiconductor material and a switching transistor using a polycrystalline semiconductor material.

In response to a data signal supplied to the gate electrode 125 of the driving transistor DT, the driving transistor DT may receive the high level voltage EVDD to control a current supplied to the light emitting device OLED and may thus adjust the amount of light emitted from the light emitting device OLED, and moreover, may supply a constant current until a data signal of a next frame is supplied, based on a voltage charged into a storage capacitor (not shown), thereby allowing the light emitting device OLED to maintain the emission of light. A high-level supply line may be formed in parallel with a data line.

The driving transistor DT may include a semiconductor layer 115 disposed on a first insulation layer 110, a gate electrode 125 overlapping the semiconductor layer 115 with a second insulation layer 120 therebetween, and a source and drain electrode 140 which is formed on a third insulation layer 135 and contacts the semiconductor layer 115.

The semiconductor layer 115 may be a region where a channel of the driving transistor DT is formed. The semiconductor layer 115 may include an oxide semiconductor, or may include various organic semiconductors such as amorphous silicon (a-Si), polycrystalline silicon (poly-Si), or pentancene, but embodiments of the present disclosure are not limited thereto. The semiconductor layer 115 may be formed on the first insulation layer 110. The semiconductor layer 115 may include a channel region, a source region, and a drain region. The channel region may overlap the gate electrode 125 with the first insulation layer 110 therebetween to form the channel region between the source electrode 140 and the drain electrode 140. The source region may be electrically connected to the source electrode 140 through a contact hole passing through the second insulation layer 120 and the third insulation layer 135. The drain region may be electrically connected to the drain electrode 140 through a contact hole passing through the second insulation layer 120 and the third insulation layer 135. A buffer layer 105 and the first insulation layer 110 may be disposed between the semiconductor layer 115 and the substrate 101. The buffer layer 105 may delay the diffusion of water and/or oxygen penetrating into the substrate 101. The first insulation layer 110 may protect the semiconductor layer 115 and may prevent or at least reduce various kinds of defects from occurring in the substrate 101.

An uppermost layer of the buffer layer 105 contacting the first insulation layer 110 may include a material having an etching characteristic which differs from that of each of the other layers of the buffer layer 105, the first insulation layer 110, the second insulation layer 120, and the third insulation layer 135. The uppermost layer of the buffer layer 105 contacting the first insulation layer 110 may include one of nitride silicon (SiNx) and oxide silicon (SiOx). The other layers of the buffer layer 105, the first insulation layer 110, the second insulation layer 120, and the third insulation layer 135 may include the other of SiNx and SiOx. For example, the uppermost layer of the buffer layer 105 contacting the first insulation layer 110 may include SiNx, and the other layers of the buffer layer 105, the first insulation layer 110, the second insulation layer 120, and the third insulation layer 135 may include SiOx, but embodiments of the present disclosure are not limited thereto.

The gate electrode 125 may be formed on the second insulation layer 120 and may overlap the channel region of the semiconductor layer 115 with the second insulation layer 120 therebetween. The gate electrode 125 may include a first conductive material which is a single layer or a multilayer including one of magnesium (Mg), molybdenum (Mo), aluminum (Al), chrome (Cr), gold (Au), titanium (Ti), nickel (Ni), neodymium (Nd), and copper (Cu), or an alloy thereof, but embodiments of the present disclosure are not limited thereto.

The source electrode 140 may be connected to the source region of the semiconductor layer 115 exposed through a contact hole passing through the second insulation layer 120 and the third insulation layer 135. The drain electrode 140 may face the source electrode 140 and may be connected to the drain region of the semiconductor layer 115 exposed through a contact hole passing through the second insulation layer 120 and the third insulation layer 135.

The source region and the drain region may be a region which is conductive by doping a Group 5 or 3 impurity ion (for example, phosphorus (P) or boron (B)) on an intrinsic polycrystalline semiconductor material at a certain concentration. The channel region may allow a polycrystalline semiconductor material or an oxide semiconductor material to maintain an intrinsic state and may provide a path through which an electron or a hole moves.

The source and drain electrode 140 may include a second conductive material which is a single layer or a multilayer including one of Mg, Mo, Al, Cr, Au, Ti, Ni, Nd, and Cu, or an alloy thereof, but embodiments of the present disclosure are not limited thereto.

A connection electrode 155 may be disposed between a first middle layer 150 and a second middle layer 160. The connection electrode 155 may be exposed through a connection electrode contact hole 156 passing through a protection layer 145 and the first middle layer 150. The connection electrode 155 may include a material which is low in resistivity, identical or similar to the drain electrode 140, but embodiments of the present disclosure are not limited thereto.

The light emitting device OLED including an emission layer 172 may be disposed on the second middle layer 160 and a bank layer 165. The light emitting device OLED may include an anode electrode 171, at least one emission layer 172 formed on the anode electrode 171, and a cathode electrode 173 formed on the emission layer 172.

The anode electrode 171 may be disposed on the first middle layer 150 through a contact hole passing through the second middle layer 160 and may be electrically connected to the connection electrode 155 exposed at a portion on the second middle layer 160.

The anode electrode 171 may be formed to be exposed by the bank layer 165. The bank layer 165 may include an opaque material (for example, black) so as to prevent or at least reduce optical interference between adjacent subpixels. In this case, the bank layer 165 may include a light blocking material including at least one of a color pigment, organic black, and carbon, but embodiments of the present disclosure are not limited thereto.

At least one emission layer 172 may be formed on the anode electrode 171 of an emission region provided by the bank layer 165. The at least one emission layer 172 may include a hole transport layer, a hole injection layer, a hole blocking layer, an emission layer 172, an electron injection layer, an electron blocking layer, and an electron transport layer on the anode electrode 171 and may be stacked and formed sequentially or in reverse order in an emission direction. Also, the emission layer 172 may include first and second emission stacks facing each other with a charge generating layer therebetween. In this case, one emission layer 172 of the first and second emission stacks may generate blue light, and the other emission layer 172 of the first and second emission stacks may generate yellow-green light, whereby white light may be generated through the first and second emission stacks. The white light generated by the emission stack may be incident on a color filter disposed on or under the emission layer 172, and thus, a color image may be implemented. As another example, each emission layer 172 may generate color light corresponding each pixel to implement a color image, without a separate color filter. For example, an emission layer 172 of a red subpixel may generate red light, an emission layer 172 of a green subpixel may generate green light, and an emission layer 172 of a blue subpixel may generate blue light. The cathode electrode 173 may be formed to be opposite to the anode electrode 171 with the emission layer 172 therebetween.

An encapsulation layer 180 may prevent or at least reduce the penetration of external water or oxygen into the light emitting device OLED. To this end, the encapsulation layer 180 may include at least one-layer inorganic encapsulation layer and at least one-layer organic encapsulation layer, but embodiments of the present disclosure are not limited thereto. In the present disclosure, a structure of the encapsulation layer 180 where the first encapsulation layer 181, the second encapsulation layer 182, and the third encapsulation layer 183 are sequentially stacked may be described for example.

The first encapsulation layer 181 may be formed on the substrate 101 where the cathode electrode 173 is formed. The third encapsulation layer 183 may be formed on the substrate 101 where the second encapsulation layer 182 is formed and may be formed to surround an upper surface, a lower surface, and a lateral surface of the second encapsulation layer 182 along with the first encapsulation layer 181. The first encapsulation layer 181 and the third encapsulation layer 183 may minimize, prevent or at least reduce the penetration of external water or oxygen into the light emitting device OLED. The first encapsulation layer 181 and the third encapsulation layer 183 may include an inorganic insulating material, which is capable of low temperature deposition, such as SiNx, SiOx, oxynitride silicon (SiON), or oxide aluminum ($Al_2O_3$). The first encapsulation layer 181 and the third encapsulation layer 183 may be deposited in a low temperature atmosphere, and thus, may prevent or at least reduce the damage of the light emitting device OLED vulnerable to a high temperature atmosphere when performing a deposition process of the first encapsulation layer 181 and the third encapsulation layer 183.

The second encapsulation layer 182 may perform a buffer function of decreasing a stress between layers caused by the bending of the display apparatus and may planarize a step height between layers. The second encapsulation layer 182 may be formed on the substrate 101 where the first encapsulation layer 181 is formed and may include acryl resin, epoxy resin, phenolic resin, polyamide resin, polyimide resin, and polyethylene, or a non-photosensitive organic insulating material such as silicon oxycarbon (SiOC), or a photosensitive organic insulating material such as photo acryl, but embodiments of the present disclosure are not limited thereto. In a case where the second encapsulation layer 182 is formed through an inkjet process, a dam DAM may be disposed to prevent the second encapsulation layer 182 from being diffused to an edge of the substrate 101. The dam DAM may be disposed closer to the edge of the substrate 101 than the second encapsulation layer 182. The dam DAM may prevent the second encapsulation layer 182 from being diffused to a pad region where a conductive pad dispose at an outermost portion of the substrate 101 is provided.

The dam DAM may be designed to prevent or at least reduce the diffusion of the second encapsulation layer 182, but in a case where the second encapsulation layer 182 is formed to flow over a height of the dam DAM in a process, the second encapsulation layer 182 which is an organic layer may be exposed at the outside, and due to this, water may penetrate into the light emitting device OLED. Accordingly, in order to solve such a problem, the dam DAM may be provided as eleven or more to overlap each other.

The dam DAM may be disposed on the protection layer 145 of a non-display area NA. Also, the dam DAM may be formed simultaneously with the first middle layer 150 and the second middle layer 160. A lower layer of the dam DAM may be formed together when forming the first middle layer 150, and an upper layer of the dam DAM may be formed together when forming the second middle layer 160, and thus, the dam DAM may be stacked and formed in a double structure. Accordingly, the dam DAM may include the same insulating material as that of the first middle layer 150 and the second middle layer 160, but embodiments of the present disclosure not limited thereto.

The dam DAM may be formed to overlap a low-level driving power line EVSS. For example, the low-level driving power line EVSS may be formed in a lower layer of a region, where the dam DAM is disposed, of the non-display area NA.

The low-level driving power line EVSS and the gate driver 300 configured as a gate in panel (GIP) type may be formed to surround an outer portion of the display panel 100, and the low-level driving power line EVSS may be disposed more outward than the gate driver 300. The gate driver 300 is simply illustrated in the drawings such as a plan view and a cross-sectional view, but is not limited thereto and may be configured in the same structure as that of the driving transistor DT of the display area AA.

The low-level driving power line EVSS may be disposed more outward than the gate driver 300. The low-level driving power line EVSS may be disposed more outward than the gate driver 300 and may be disposed to surround the display area AA. The low-level driving power line EVSS may include the same material as that of the source and drain electrode 140 of the TFT, but embodiments of the present disclosure are not limited thereto. For example, the low-level driving power line EVSS may include the same material as that of the gate electrode 125. Also, the low-level driving power line EVSS may be electrically connected to the anode electrode 171. The low-level driving power line EVSS may supply the low-level voltage EVSS to a plurality of pixels of the display area AA.

A touch layer 190 may be disposed on the encapsulation layer 180. In the touch layer 190, a touch buffer layer 191 may be disposed between the cathode electrode 173 of the light emitting device OLED and a touch sensor metal including touch electrodes 195 and 196 and touch electrode connection lines 192 and 194.

The touch buffer layer 191 may prevent or at least reduce external water or a chemical solution (for example, a developer or an etchant), which is used in a manufacturing process of the touch sensor metal disposed on the touch buffer layer 191, from penetrating into the emission layer 172 including an organic material. Accordingly, the touch buffer layer 191 may prevent or at least reduce the damage of the emission layer 172 vulnerable to the chemical solution or water.

The touch buffer layer 191 may include an organic insulating material which has a low dielectric constant of 1 to 3 and is capable of being formed at a low temperature of a certain temperature (for example, 100° C.) or less, so as to prevent or at least reduce the damage of the emission layer 172 including an organic material vulnerable to a high temperature. For example, the touch buffer layer 191 may include an acrylic material, an epoxy-based material, or a siloxan-based material. The touch buffer layer 191 which includes an organic insulating material and has planarization performance may prevent or at least reduce the damage of the encapsulation layer 180 caused by the bending of an organic light emitting display apparatus and the breakage of the touch sensor metal formed on the touch buffer layer 191.

According to a touch sensor structure based on a mutual capacitance, the touch electrodes 195 and 196 may be disposed on the touch buffer layer 191, and the touch electrodes 195 and 196 may be disposed to intersect with each other.

The touch electrode connection lines 192 and 194 may electrically connect the touch electrodes 195 and 196 with each other. The touch electrode connection lines 192 and 194 and the touch electrodes 195 and 196 may be disposed in different layers with the touch insulation layer 193 therebetween. The touch electrode connection lines 192 and 194 may be disposed to overlap the bank layer 165 and may prevent or at least reduce a reduction in aperture ratio.

Furthermore, in the touch electrodes 195 and 196, a portion of the touch electrode connection line 192 may pass through an upper portion and a lateral surface of the encapsulation layer 180 and an upper portion and a lateral surface of the dam DAM and may be electrically connected to a touch driving circuit (not shown) through a touch pad 198.

A portion of the touch electrode connection line 192 may be supplied with a touch driving signal from a touch driving circuit and may transfer the touch driving signal to the touch electrodes 195 and 196, or may transfer touch sensing signals of the touch electrodes 195 and 196 to the touch driving circuit.

A touch protection layer 197 may be disposed on the touch electrodes 195 and 196. In the drawings, the touch protection layer 197 is illustrated as being disposed on only the touch electrodes 195 and 196, but embodiments of the present disclosure are not limited thereto and the touch protection layer 197 may extend up to a previous portion or a next portion with respect to the dam DAM and may be disposed on the touch electrode connection line 192.

Moreover, a color filter (not shown) may be further disposed on the encapsulation layer 180, and the color filter may be disposed on the touch layer 190 or may be disposed between the encapsulation layer 180 and the touch layer 190.

Figure 3:
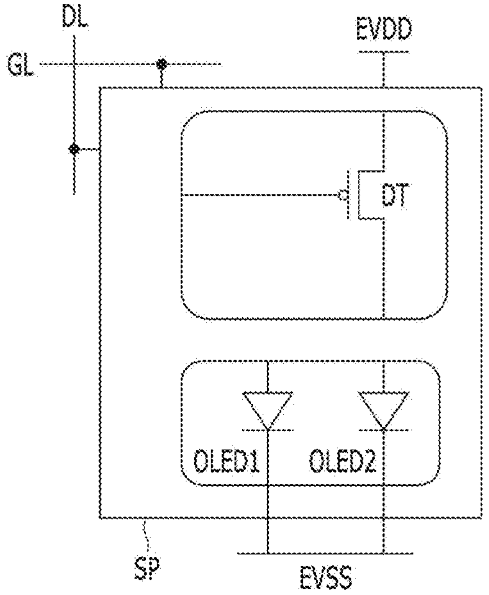
FIG. 3 is a first diagram illustrating a portion of a device included in a subpixel according to the first embodiment of the present disclosure.
Figure 4:
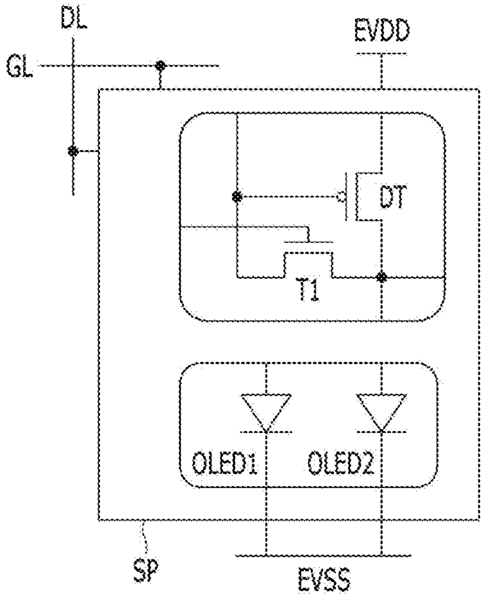
FIG. 4 is a second diagram illustrating a portion of a device included in a subpixel according to the first embodiment of the present disclosure.
Figure 5:
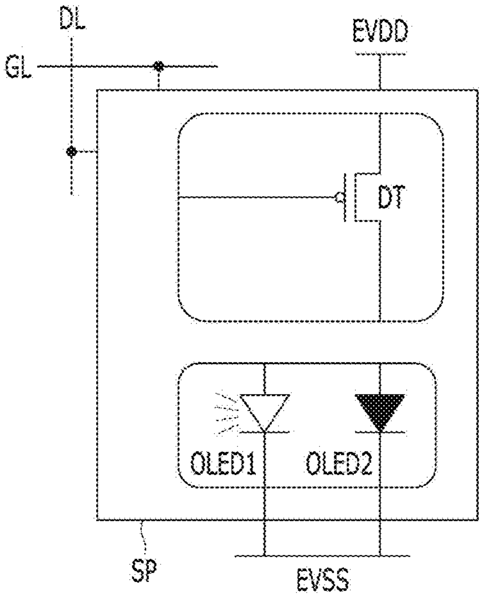
FIGS. 5 and 6 are diagrams illustrating an operation characteristic of a subpixel according to the first embodiment of the present disclosure.
Figure 6:
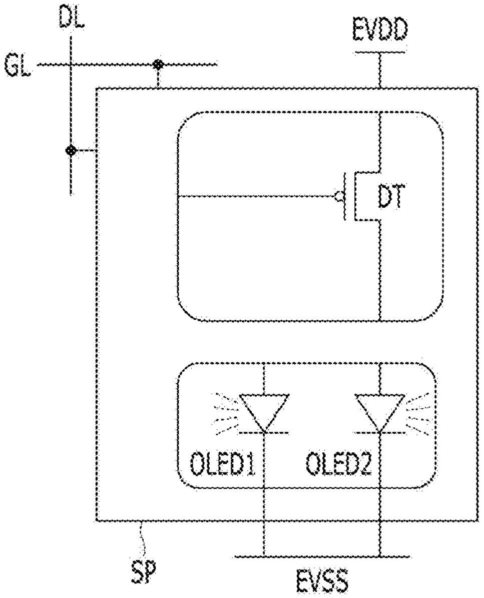

FIG. 3 is a first diagram illustrating a portion of a device included in a subpixel according to the first embodiment of the present disclosure, FIG. 4 is a second diagram illustrating a portion of a device included in a subpixel according to the first embodiment of the present disclosure, and FIGS. 5 and 6 are diagrams illustrating an operation characteristic of a subpixel according to the first embodiment of the present disclosure.

As illustrated in FIG. 3, a subpixel SP according to the first embodiment may include a driving transistor DT and at least two light emitting devices OLED1 and OLED2. The driving transistor DT may be implemented as a p type. The p-type driving transistor DT may operate in response to a low voltage. The at least two light emitting devices OLED1 and OLED2 may emit light with a driving current generated based on an operation of the driving transistor DT.

As illustrated in FIG. 4, a subpixel SP may include a first transistor T1, a driving transistor DT, and at least two light emitting devices OLED1 and OLED2. The first transistor T1 may be implemented as an n type, and the driving transistor DT may be implemented as a p type. The n-type first transistor T1 may operate in response to a high voltage, and the p-type driving transistor DT may operate in response to a low voltage. The at least two light emitting devices OLED1 and OLED2 may emit light with a driving current generated based on operations of the first transistor T1 and the driving transistor DT.

As illustrated in FIGS. 3 and 4, the subpixel SP may be implemented based on a transistor of one type, or may be implemented based on transistors of two types. Also, the subpixel SP may further include a circuit for compensating for the driving transistor DT and the light emitting devices OLED1 and OLED2. Therefore, the circuit included in the subpixel SP may be variously implemented and should refer to FIGS. 3 and 4. Hereinafter, an operation characteristic of a subpixel SP according to the first embodiment will be described with reference to FIG. 3.

As illustrated in FIGS. 5 and 6, a subpixel SP according to the first embodiment may operate so that only a first light emitting device OLED1 of at least two light emitting devices OLED1 and OLED2 emits light in a first driving mode. Here, the first light emitting device OLED1 may be merely an embodiment, and only a second light emitting device OLED2 may emit light. Also, the subpixel SP according to the first embodiment may operate so that the at least two light emitting devices OLED1 and OLED2 emit light in a second driving mode.

Furthermore, the subpixel SP according to the first embodiment may prevent or at least reduce a driving current from concentrating on the at least two light emitting devices OLED1 and OLED2 when operating in the second driving mode. This will be described below.

Figure 7:
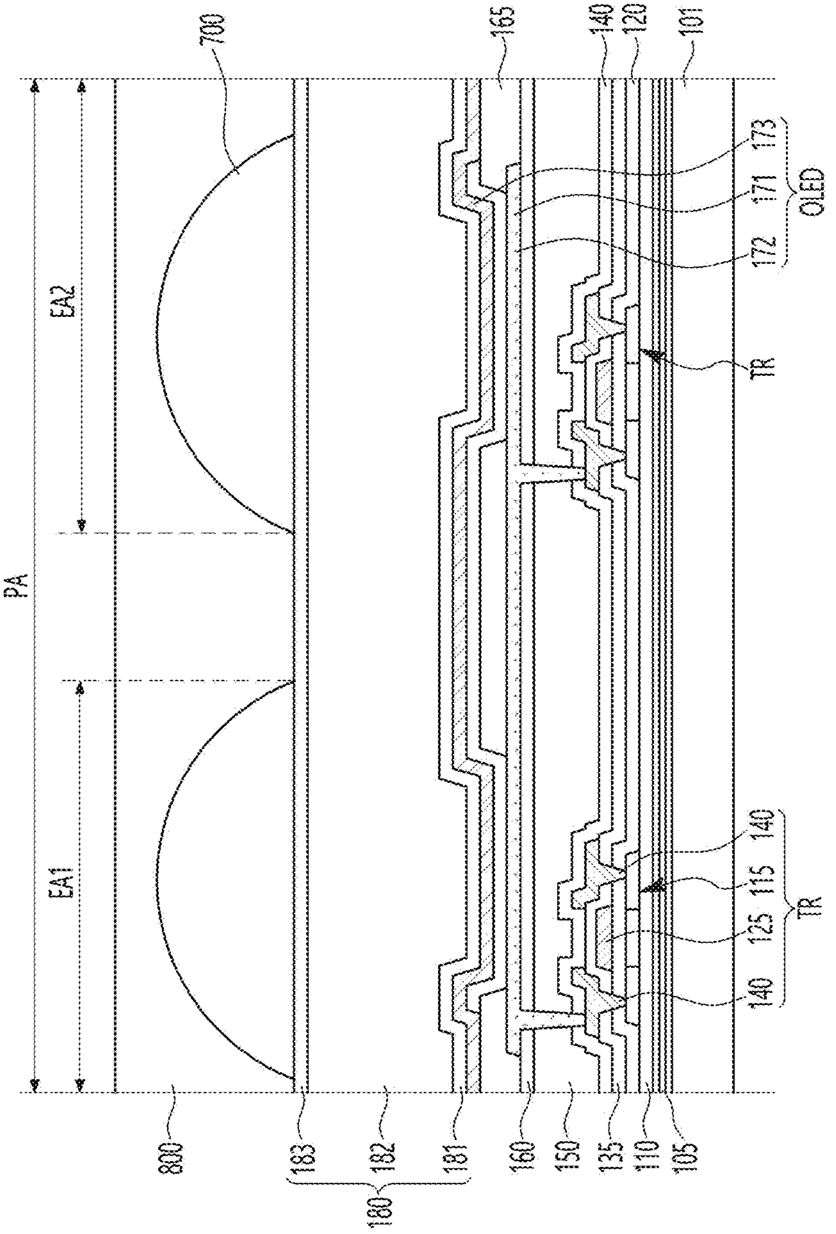
FIG. 7 is a cross-sectional view illustrating a stack type of a subpixel seen in FIG. 5 or FIG. 6 according to the first embodiment of the present disclosure.

FIG. 7 is a cross-sectional view illustrating a stack type of a subpixel seen in FIG. 5 or 6 according to the first embodiment of the present disclosure.

As illustrated in FIG. 7, a subpixel capable of being seen in FIG. 5 or 6 may be implemented in a structure where two emission regions EA1 and EA2 are included in one pixel area PA. Each of the two emission regions EA1 and EA2 may include a light emitting device OLED and a transistor TR for transferring a driving current to the light emitting device OLED. An example is illustrated where two transistors TR are implemented in a structure which is similar/equal to the driving transistor DT illustrated and described in FIG. 2 and each include a semiconductor layer 115, a gate electrode 125, and a source and drain electrode 140, but embodiments of the present disclosure are not limited thereto.

Each of the two emission regions EA1 and EA2 may include a pixel lens 700 for collecting light emitted from two light emitting devices OLED. Two pixel lenses 700 may be disposed to overlap the two light emitting devices OLED. The pixel lens 700 may be disposed on an encapsulation layer 180, and a lens protection layer 800 may protect the pixel lens 700 from an external impact, but embodiments of the present disclosure are not limited thereto.

Figure 8:
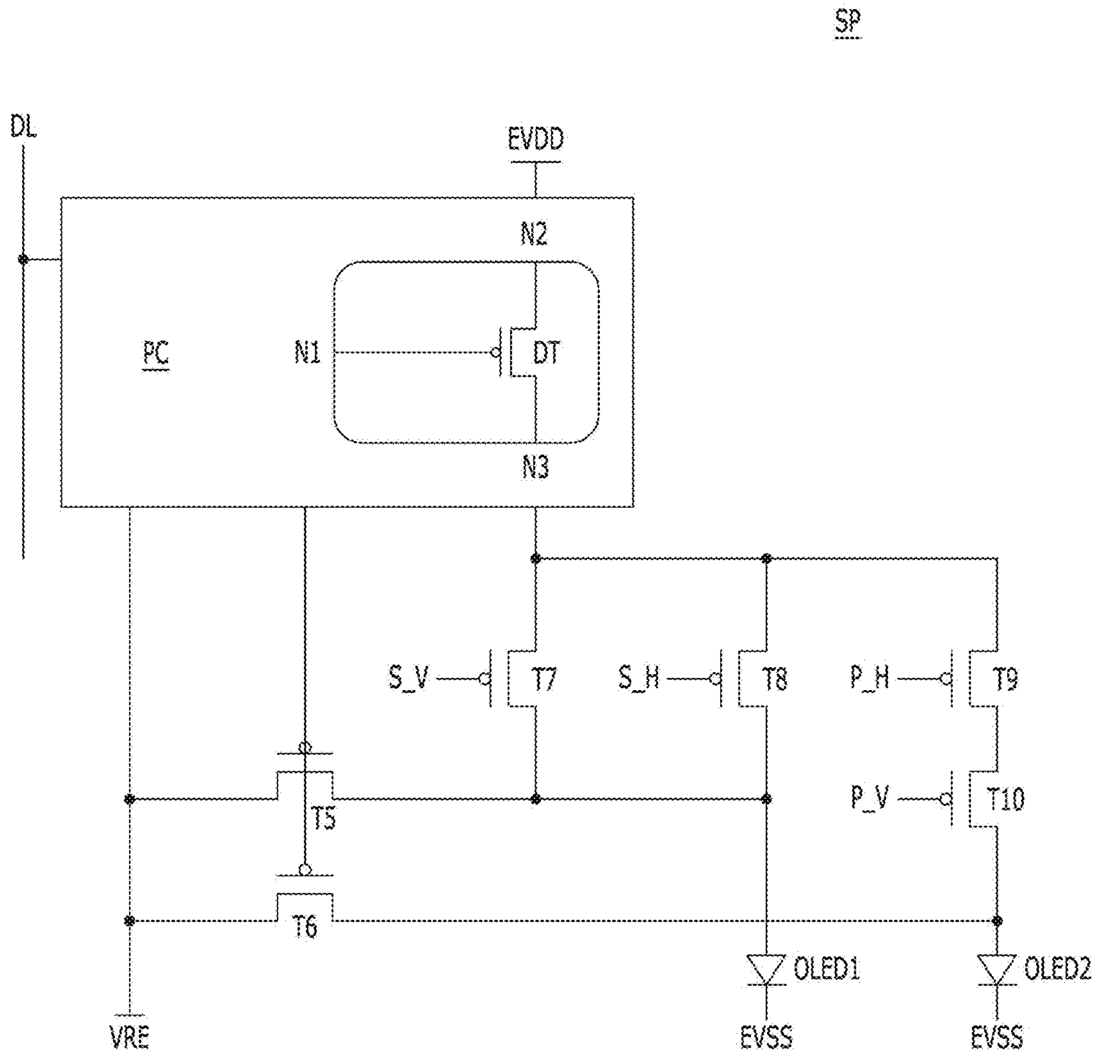
FIG. 8 is a diagram illustrating a portion of a device included in a subpixel according to a second embodiment of the present disclosure.
Figure 9:
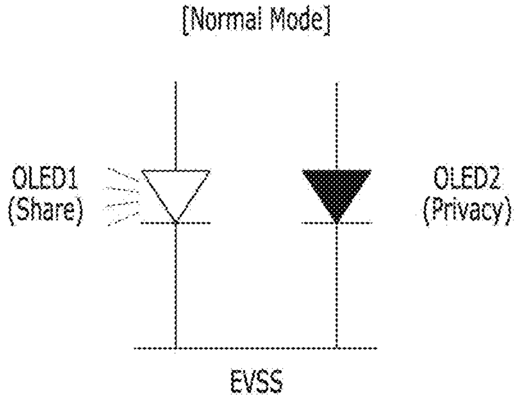
FIG. 9 is a diagram illustrating an operation characteristic of a subpixel according to the second embodiment of the present disclosure.
Figure 9:
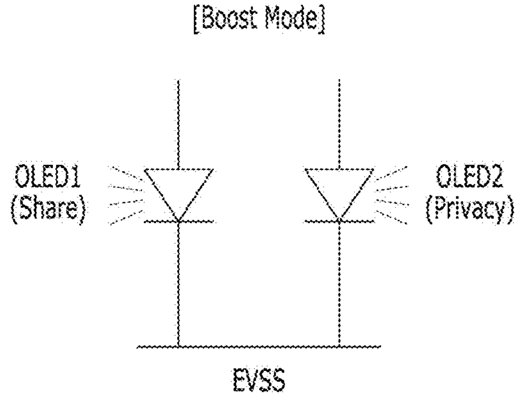

FIG. 8 is a diagram illustrating a portion of a device included in a subpixel according to a second embodiment of the present disclosure, and FIG. 9 is a diagram illustrating an operation characteristic of a subpixel according to the second embodiment of the present disclosure.

As illustrated in FIG. 8, a subpixel SP according to the second embodiment may include a pixel circuit PC including a driving transistor DT, a plurality of switching transistors (for example, fifth to tenth switching transistors) T5 to T10, and at least two light emitting devices OLED1 and OLED2.

The pixel circuit PC may operate based on a circuit connected to a first node N1, a second node N2, and a third node N3 of the driving transistor DT to generate a driving current. The switching transistors T5 to T10 may perform an operation of applying a reference voltage to the pixel circuit PC and nodes of the light emitting devices OLED1 and OLED2 and an operation of preventing or at least reducing the driving current from concentrating on the at least two light emitting devices OLED1 and OLED2.

For example, the fifth switching transistor T5 and the sixth switching transistor T6 may perform an operation of applying the reference voltage, applied through a reference line VRE, to the pixel circuit PC and the nodes of the light emitting devices OLED1 and OLED2. Also, the seventh to tenth switching transistors T7 to T10 may perform an operation of preventing or at least reducing the driving current from concentrating on the at least two light emitting devices OLED1 and OLED2. The seventh to tenth switching transistors T7 to T10 may each be defined as a mode selection transistor.

The seventh switch transistor T7 may be turned on based on a first direction share signal applied through a first direction share signal line S_V and may apply the driving current, generated from the driving transistor DT, to an anode electrode of a first light emitting device OLED1. The seventh switch transistor T7 may be defined as a first direction share mode selection transistor.

The eighth switch transistor T8 may be turned on based on a second direction share signal applied through a second direction share signal line S_H and may apply the driving current, generated from the driving transistor DT, to the anode electrode of the first light emitting device OLED1. The eighth switch transistor T8 may be defined as a second direction share mode selection transistor.

The ninth switch transistor T9 may be turned on based on a second direction privacy signal applied through a second direction privacy signal line P_H and may transfer the driving current, generated from the driving transistor DT, to the tenth switching transistor T10. The ninth switch transistor T9 may be defined as a second direction privacy mode selection transistor.

The tenth switch transistor T10 may be turned on based on a first direction privacy signal applied through a first direction privacy signal line P_V and may transfer the driving current, generated from the driving transistor DT, to an anode electrode of a second light emitting device OLED2. The tenth switch transistor T10 may be defined as a first direction privacy mode selection transistor.

The subpixel SP according to the second embodiment may operate so that only the first light emitting device OLED1 of the at least two light emitting devices OLED1 and OLED2 emits light in the first driving mode. Also, the subpixel SP according to the second embodiment may operate so that the at least two light emitting devices OLED1 and OLED2 emit light in the second driving mode.

As illustrated in FIG. 9, the first driving mode may be defined as a normal mode (a single emission mode), and the second driving mode may be defined as a boost mode (a double emission mode). The first light emitting device OLED1 may be defined as a share light emitting device which enables all of a user of a first viewpoint and a user of a second viewpoint to see light emitted therefrom, and the second light emitting device OLED2 may be defined as a privacy light emitting device which enables only the user of the first viewpoint to see light emitted therefrom.

In the normal mode, which is the first driving mode, a region where the first light emitting device OLED1 emits light and a region where the second light emitting device OLED2 emits light may be provided. In the boost mode, which is the second driving mode, a region where the first light emitting device OLED1 and the second light emitting device OLED2 emit light may be provided. The first driving mode and the second driving mode will be described below.

As illustrated in FIGS. 8 and 9, the first light emitting device OLED1 may emit light during the first driving mode (Normal Mode). To this end, the seventh switching transistor T7 and the eighth switching transistor T8 may be turned on during the first driving mode (Normal Mode).

The first light emitting device OLED1 and the second light emitting device OLED2 may emit light during the second driving mode (Boost Mode). To this end, the ninth switching transistor T9 and the tenth switching transistor T10 may be turned on during the second driving mode (Boost Mode).

Figure 10:
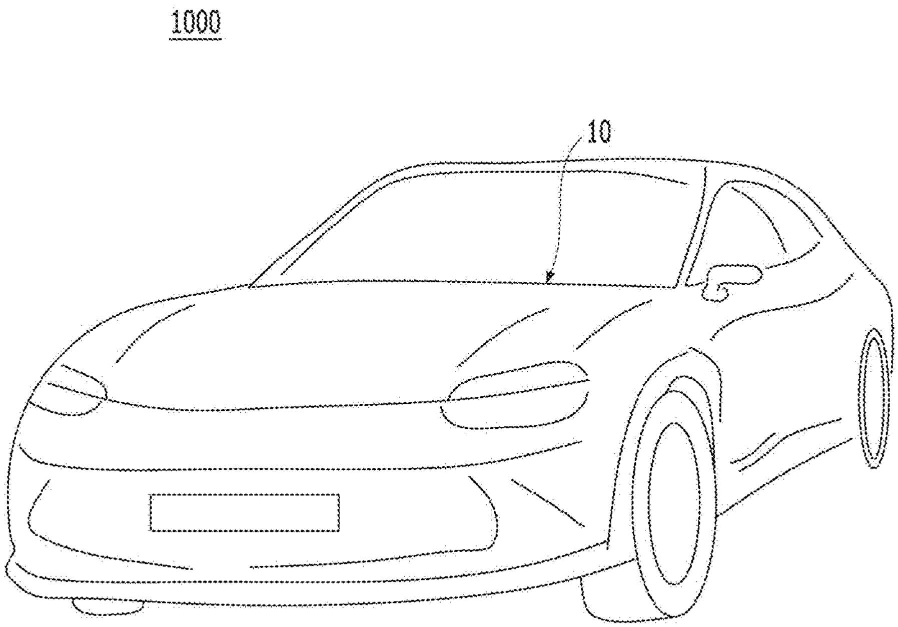
FIG. 10 is a diagram illustrating an application example of a display apparatus implemented with a subpixel of FIG. 8 according to the second embodiment of the present disclosure.
Figure 11:
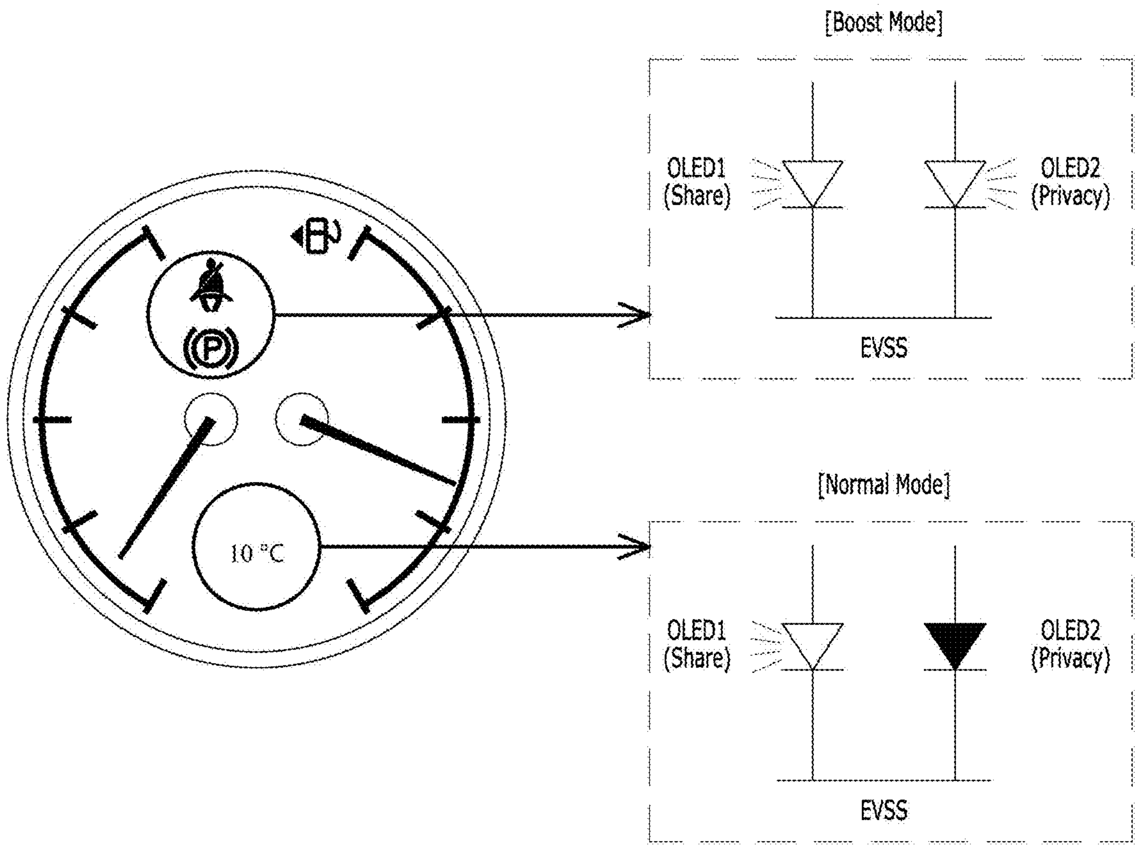
FIG. 11 is a diagram illustrating an operation characteristic of a display panel disposed in a vehicle illustrated in FIG. 10 according to the second embodiment of the present disclosure.

FIG. 10 is a diagram illustrating an application example of a display apparatus implemented with a subpixel of FIG. 8 according to the second embodiment of the present disclosure, and FIG. 11 is a diagram illustrating an operation characteristic of a display panel disposed in a vehicle illustrated in FIG. 10 according to the second embodiment of the present disclosure.

As illustrated in FIG. 10, a display apparatus 10 (hereinafter referred to as an automotive display apparatus) implemented with the subpixel of FIG. 8 may be disposed in a vehicle 1000. For example, the automotive display apparatus 10 may be disposed at a position which enables a driver sitting on a driver seat and an occupant sitting on a passenger seat to see the automotive display apparatus 10.

As illustrated in FIGS. 10 and 11, the second driving mode (Boost Mode) may be applied to a portion, displaying information (safety information, risk information, etc.) associated with the safety of the vehicle (for example, displaying a warning light (FIG. 10 illustrates a seat belt sign light and a parking sign light), of the display panel. On the other hand, the first driving mode (Normal Mode) may be applied to a portion, displaying normal information irrelevant to the safety of the vehicle (for example, displaying a normal light (FIG. 11 illustrates a thermometer), of the display panel.

According to the second embodiment, the automotive display apparatus 10 may simultaneously drive two light emitting devices OLED1 and OLED2 included in a subpixel (or a pixel) disposed at a position corresponding to a warning light when the vehicle is driving and may allow a driving current to be divided (dispersion of concentrated current) to implement high luminance, thereby decreasing a stress applied to a device (decrease current acceleration). Accordingly, a degradation in the two light emitting devices OLED1 and OLED2 may be reduced (prevent degradation acceleration), and thus, the degree of recognition of an afterimage displayed on an entire screen of the display panel may be reduced.

According to the second embodiment, the automotive display apparatus 10 may simultaneously drive the two light emitting devices OLED1 and OLED2 to divide a driving current when outputting peak luminance, and thus, may implement high luminance and may decrease a stress applied to a device. Also, according to the second embodiment, when operating in the second driving mode (Boost Mode), the automotive display apparatus 10 may implement luminance which is higher than a case which operates in the first driving mode (Normal Mode), thereby increasing visibility in a specific situation like displaying of a warning light.

Hereinafter, a circuit configuration of the subpixel illustrated in FIG. 8 may be more specified, and a driving method thereof will be described. However, embodiments of the present disclosure are not limited thereto.

Figure 12:
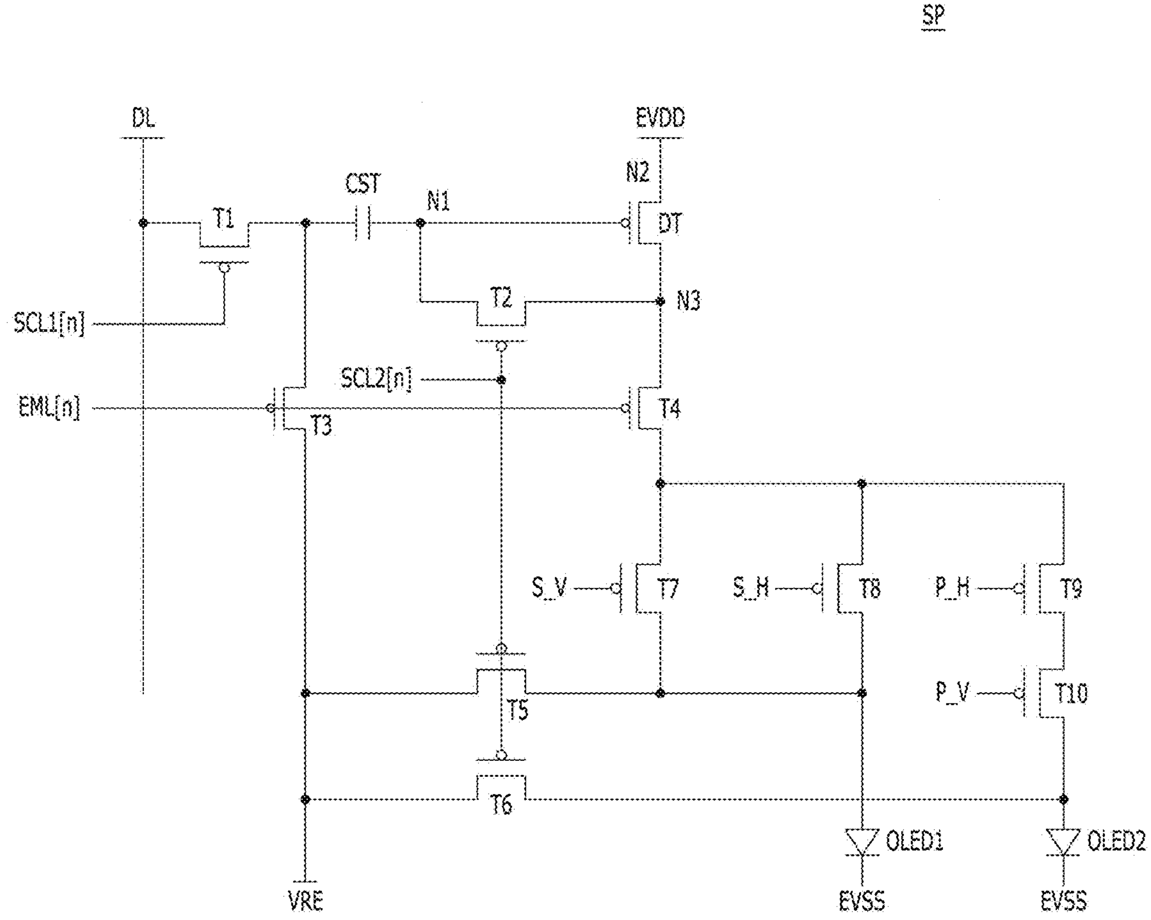
FIG. 12 is a diagram illustrating a circuit configuration of a device included in a subpixel according to a third embodiment of the present disclosure.
Figure 13:
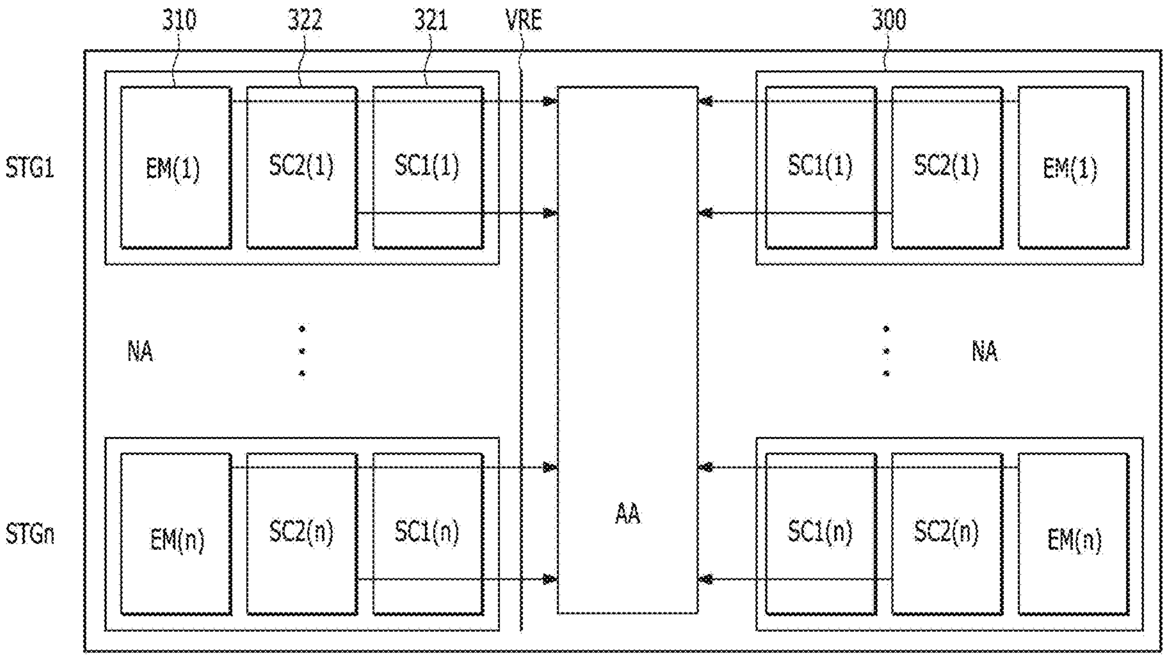
FIG. 13 is a diagram illustrating a display panel implemented with a subpixel illustrated in FIG. 12 and a gate driver for driving the display panel according to the third embodiment of the present disclosure.

FIG. 12 is a diagram illustrating a circuit configuration of a device included in a subpixel according to a third embodiment of the present disclosure, and FIG. 13 is a diagram illustrating a display panel implemented with a subpixel illustrated in FIG. 12 and a gate driver for driving the display panel according to the third embodiment of the present disclosure.

As illustrated in FIG. 12, a subpixel SP may include a driving transistor DT, first to tenth switching transistors T1 to T10, a capacitor CST, and at least two light emitting devices OLED1 and OLED2.

The driving transistor DT may include a gate electrode connected to a first node N1, a first electrode connected to a second node N2 connected to a high-level voltage line which transfers a high-level voltage EVDD, and a second electrode connected to a third node N3. The driving transistor DT may generate a driving current, based on a data voltage stored in the capacitor CST.

The first switching transistor T1 may include a gate electrode connected to a first scan line SCL1[*n*], a first electrode connected to a data line DL, and a second electrode connected to a first electrode of the capacitor CST. The first switching transistor T1 may be turned on based on a first scan signal applied through the first scan line SCL1[*n*] and may transfer a data voltage, applied through the data line DL, to the first electrode of the capacitor CST.

The second switching transistor T2 may include a gate electrode connected to a second scan line SCL2[*n*], a first electrode connected to the first node N1, and a second electrode connected to the third node N3. The second switching transistor T2 may be turned on based on a second scan signal applied through the second scan line SCL2[*n*] and may form a diode connection state of the driving transistor DT. The second transistor T2 may be turned on during a threshold voltage sampling period (or a compensation period) of the driving transistor DT.

The third switching transistor T3 may include a gate electrode connected to an emission control line EML[n], a first electrode connected to a reference voltage line VRE, and a second electrode connected to the first electrode of the capacitor CST. The third switching transistor T3 may be turned on based on an emission control signal applied through the emission control line EML[n] and may transfer a reference voltage, applied through the reference voltage line VRE, to the first electrode of the capacitor CST. The capacitor CST may be initialized (discharging of a residual electric charge) based on the reference voltage applied through the reference voltage line VRE.

The fourth switching transistor T4 may include a gate electrode connected to the emission control line EML[n], a first electrode connected to the third node N3, and a second electrode connected to a first electrode of each of the seventh switching transistor T7, the eighth switching transistor T8, and the ninth switching transistor T9. The fourth switching transistor T4 may be turned on based on the emission control signal applied through the emission control line EML[n] and may transfer the driving current, generated from the driving transistor DT, to the first electrode of each of the seventh switching transistor T7, the eighth switching transistor T8, and the ninth switching transistor T9.

The fifth switching transistor T5 may include a gate electrode connected to the second scan line SCL2[*n*], a first electrode connected to the reference voltage line VRE, and a second electrode connected to a second electrode of the seventh switching transistor T7 and an anode electrode of the first light emitting device OLED1. The fifth switching transistor T5 may be turned on based on a second scan signal applied through the second scan line SCL2[*n*] and may transfer the reference voltage, applied through the reference voltage line VRE, to the anode electrode of the first light emitting device OLED1. The first light emitting device OLED1 may be initialized (discharging of a residual electric charge) based on the reference voltage applied through the reference voltage line VRE.

The sixth switching transistor T6 may include a gate electrode connected to the second scan line SCL2[*n*], a first electrode connected to the reference voltage line VRE, and a second electrode connected to a second electrode of the tenth switching transistor T10 and an anode electrode of the second light emitting device OLED2. The sixth switching transistor T6 may be turned on based on the second scan signal applied through the second scan line SCL2[*n*] and may transfer the reference voltage, applied through the reference voltage line VRE, to the anode electrode of the second light emitting device OLED2. The second light emitting device OLED2 may be initialized (discharging of a residual electric charge) based on the reference voltage applied through the reference voltage line VRE.

The seventh switching transistor T7 may include a gate electrode connected to the first direction share signal line S_V, a first electrode connected to the second electrode of the fourth switching transistor T4, and a second electrode connected to the anode electrode of the first light emitting device OLED1. The seventh switching transistor T7 may be turned on based on the first direction share signal applied through the first direction share signal line S_V and may apply the driving current, generated from the driving transistor DT, to the anode electrode of the first light emitting device OLED1.

The eighth switching transistor T8 may include a gate electrode connected to the second direction share signal line S_H, a first electrode connected to the second electrode of the fourth switching transistor T4, and a second electrode connected to the anode electrode of the first light emitting device OLED1. The eighth switching transistor T8 may be turned on based on the second direction share signal applied through the second direction share signal line S_H and may apply the driving current, generated from the driving transistor DT, to the anode electrode of the first light emitting device OLED1.

The ninth switching transistor T9 may include a gate electrode connected to the second direction privacy signal line P_H, a first electrode connected to the second electrode of the fourth switching transistor T4, and a second electrode connected to the first electrode of the tenth switching transistor T10. The ninth switching transistor T9 may be turned on based on the second direction privacy signal applied through the second direction privacy signal line P_H and may apply the driving current, generated from the driving transistor DT, to the tenth switching transistor T10.

The tenth switching transistor T10 may include a gate electrode connected to the first direction privacy signal line P_V, a first electrode connected to the second electrode of the ninth switching transistor T9, and a second electrode connected to the anode electrode of the second light emitting device OLED2. The tenth switching transistor T10 may be turned on based on the first direction privacy signal applied through the first direction privacy signal line P_V and may apply the driving current, transferred from the ninth switching transistor T9, to the anode electrode of the second light emitting device OLED2.

As illustrated in FIG. 13, the gate driver 300 may include an emission control signal driver 310, a first scan driver 321, and a second scan driver 322. A shift register configuring the gate driver 300 may be configured in a symmetrical state at both sides of a display area AA.

However, the gate driver 300 may differ based on a circuit configuration and a driving scheme of a subpixel provided in the display area AA. For example, the emission control signal driver 310 may be disposed between the first scan driver 321 and the second scan driver 322, or may be disposed between the first scan driver 321 and the display area AA. Accordingly, an arrangement structure of FIG. 12 should be understood for example.

Stages STG1 to STGn of the shift register may respectively include first scan signal generators SC1(1) to SC1(*n*), second scan signal generators SC2(1) to SC2(*n*), and emission control signal generators EM(1) to EM(n). In FIG. 13, an $N_{th}$ stage STGn of the shift register is illustrated as a last stage. However, at least one dummy stage may be disposed at a previous end with respect to the first stage STG1, and at least one dummy stage may be disposed at a next end with respect to the first stage STG1.

The first scan signal generators SC1(1) to SC1(*n*) may output a first scan signal through a first scan line of the display panel 100. The second scan signal generators SC2(1) to SC2(*n*) may output a second scan signal through a second scan line of the display panel 100. The emission control signal generators EM(1) to EM(n) may output an emission control signal through an emission control line of the display panel 100.

In FIG. 13, it is illustrated that only one reference voltage line VRE is disposed at a left side of the display area AA, but embodiments of the present disclosure are not limited thereto and the reference voltage line VRE may be disposed at both sides and may also be provided in plurality. Furthermore, although not illustrated in FIG. 13, lines for applying a signal or a voltage to the shift register may be disposed adjacent to signal generators, but this may be changed based on a material of a line or an arrangement relationship with a different line.

Figure 14:
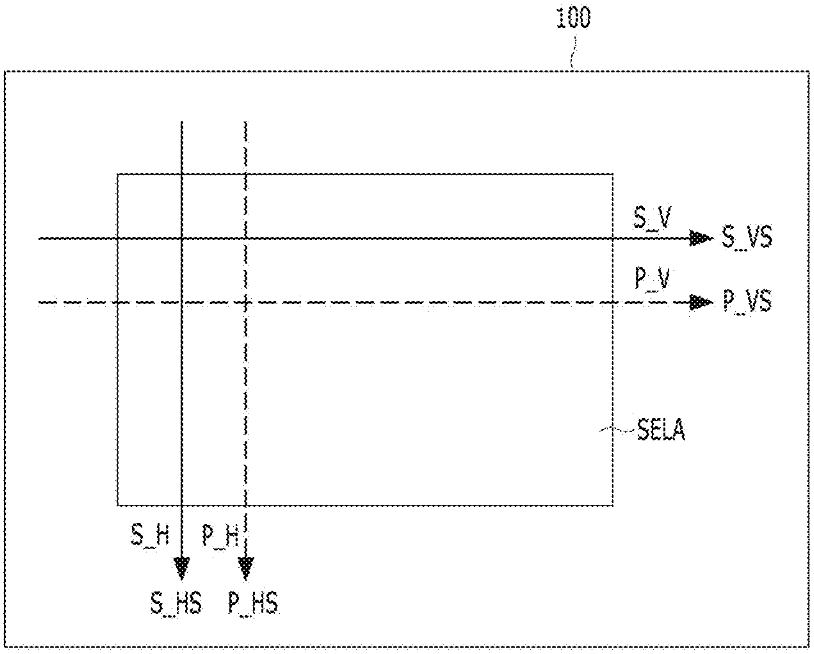
FIG. 14 is a diagram for describing the arrangement of a share signal line and a privacy signal line and a region selection method based on signals applied through the lines, according to the third embodiment of the present disclosure.
Figure 15:
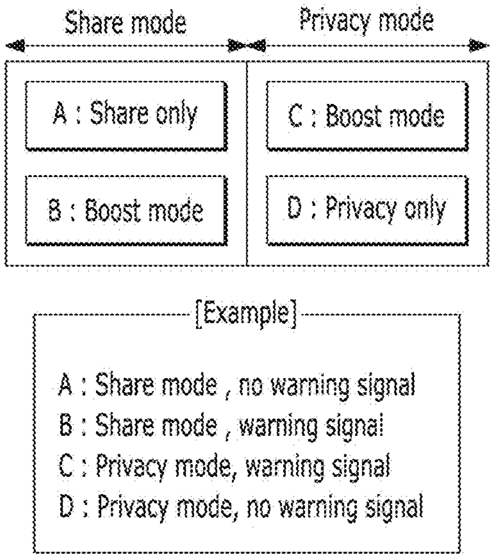

FIG. 14 is a diagram for describing the arrangement of a share signal line and a privacy signal line and a region selection method based on signals applied through the lines, according to the third embodiment of the present disclosure, and FIGS. 15 and 16 are diagrams for describing a region-based driving mode of a display panel according to the third embodiment of the present disclosure.

As illustrated in FIG. 14, in a display panel 100 of an automotive display apparatus, a selection region SELA to which a first direction share signal S_VS, a second direction share signal S_HS, a first direction privacy signal P_VS, and a second direction privacy signal P_HS are applied may operate in the second driving mode. The display panel 100 of the automotive display apparatus may select an upper/lower region for operating in the second driving mode, based on the first direction share signal S_VS and the first direction privacy signal P_VS, and may select a left/right region for operating in the second driving mode, based on the second direction share signal S_HS and the second direction privacy signal P_HS.

As illustrated in FIGS. 12 and 14, the first direction share signal S_VS may be transferred through a first direction share signal line S_V, the second direction share signal S_HS may be transferred through a second direction share signal line S_H, the first direction privacy signal P_VS may be transferred through a first direction privacy signal line P_V, and the second direction privacy signal P_HS may be transferred through a second direction privacy signal line P_H.

Here, the first direction share signal S_VS and the first direction privacy signal line P_V may be identically arranged in a first direction and may be apart from each other, and the second direction share signal S_HS and the second direction privacy signal line P_H may be identically arranged in a second direction intersecting with the first direction and may be apart from each other.

Furthermore, the first direction share signal line S_V and the first direction privacy signal line P_V may include a metal layer (see the gate electrode 125 of FIG. 2) configuring a scan line, and the second direction share signal line S_H and the second direction privacy signal line P_H may include a metal layer (see the source and drain electrode 140 of FIG. 2) configuring a data line. However, this may be merely an embodiment, but is not limited thereto.

As illustrated in FIGS. 14 and 15, the display panel 100 may include a share region (Share mode) (a first display area) which is driven in a share mode and a privacy region (Privacy mode) (a first display area) which is driven in a privacy mode. The share region (Share mode) which is driven in the share mode may be defined as a region which enables a driver sitting on a driver seat and an occupant sitting on a passenger seat to see an image displayed on the display panel 100. The privacy region (Privacy mode) which is driven in the privacy mode may be defined as a region which enables only an occupant sitting on a passenger seat to see an image displayed on the display panel 100.

The share region (Share mode) may include a first region A (Share only) capable of only the share mode and a second region B (Boost mode) capable of only the second driving mode. For example, the first region A capable of only the share mode may be defined as a region (no warning signal) which does not display information associated with the safety of a vehicle, and the second region B capable of only the second driving mode may be defined as a region (warning signal) which displays the information associated with the safety of the vehicle.

The privacy region (Privacy mode) may include a third region C (Boost mode) capable of only the second driving mode and a fourth region D (Share only) capable of only the privacy mode. For example, the third region C capable of only the second driving mode may be defined as a region (warning signal) which displays the information associated with the safety of the vehicle, and the fourth region D capable of only the privacy mode may be defined as a region (no warning signal) which does not display the information associated with the safety of the vehicle.

The first region A of the share region (Share mode) and the fourth region D of the privacy region (Privacy mode) may be defined as a region which is capable of operating in the first driving mode, and the second region B of the share region (Share mode) and the third region C of the privacy region (Privacy mode) may be defined as a region which is capable of operating in the second driving mode.

In FIG. 15, a method of applying signals for selecting at least one of the first region A and the second region B of the share region (Share mode) and the third region C and the fourth region D of the privacy region (Privacy mode) may refer to a table of FIG. 16. In FIG. 16, a low voltage L may denote a gate on voltage for turning on a switching transistor connected to a share signal line and a privacy signal line, and a high voltage H may denote a gate off voltage for turning off the switching transistor connected to the share signal line and the privacy signal line. However, the table of FIG. 16 may be shown with respect to a p-type switching transistor, and thus, when selected as an n-type switching transistor, an operating condition thereof may be opposite thereto.

Furthermore, in FIG. 15, an example where a region capable of operating in the second driving mode is included in all of the share region (Share mode) and the privacy region (Privacy mode) has been described. However, this may be merely an embodiment, the region capable of operating in the second driving mode may be disposed in only the share region (Share mode).

Figure 17:
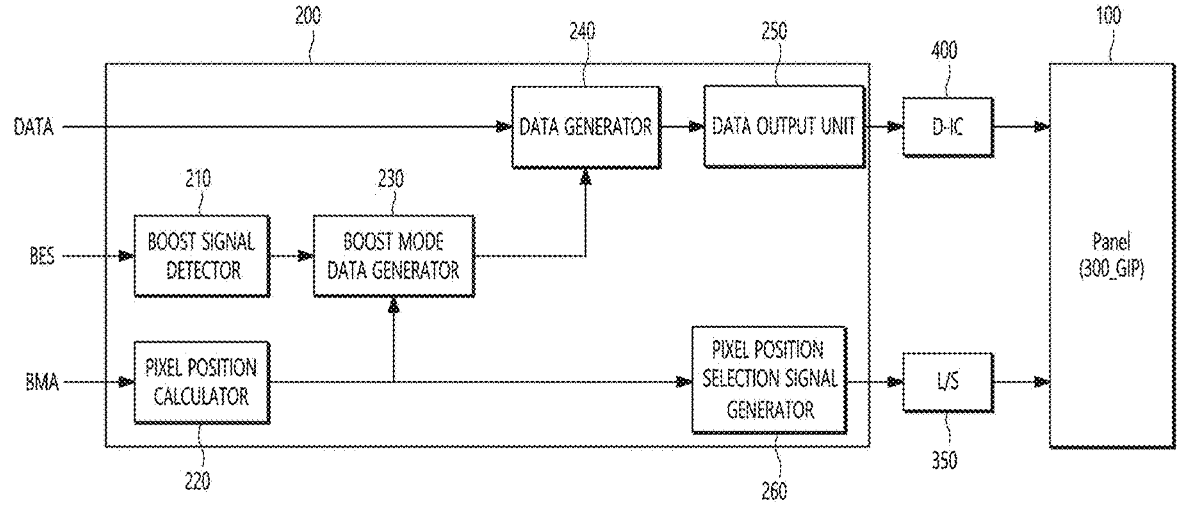
FIG. 17 is a first diagram illustrating a portion of an internal configuration of a controller for generating a signal based on a mode according to the third embodiment of the present disclosure.
Figure 18:
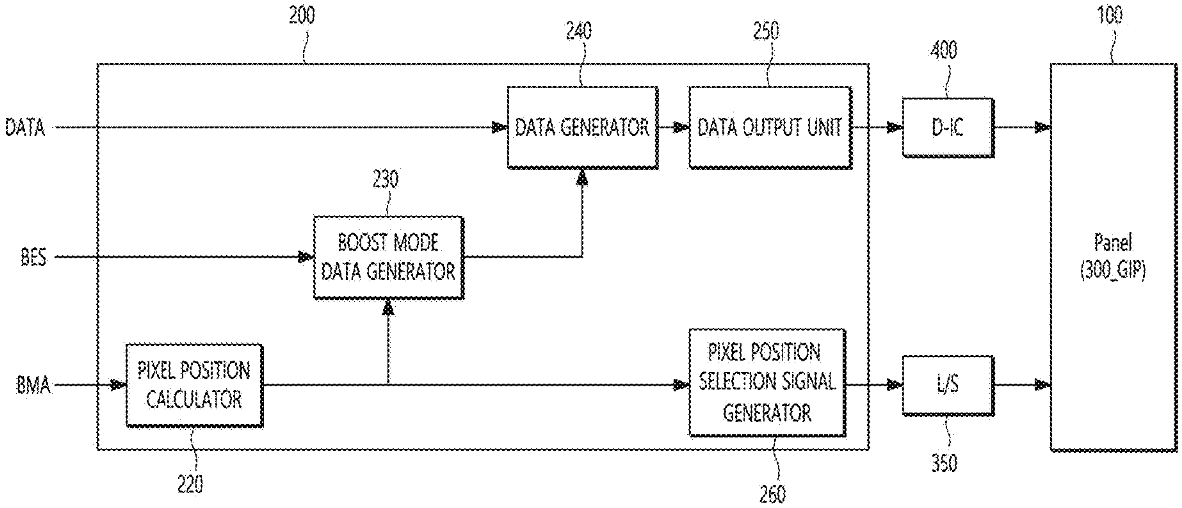
FIG. 18 is a second diagram illustrating a portion of an internal configuration of a controller for generating a signal based on a mode according to the third embodiment of the present disclosure.
Figure 19:
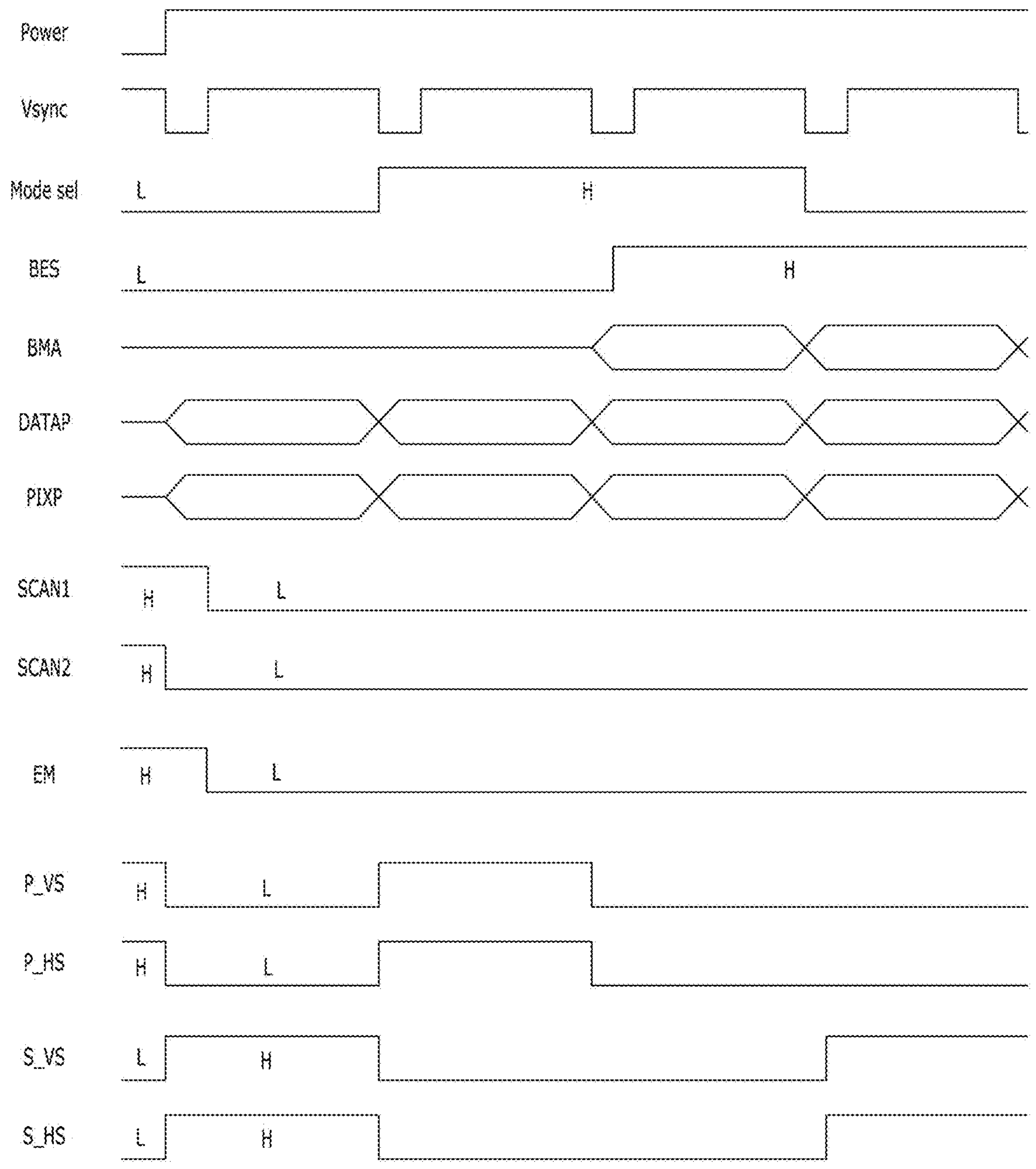
FIG. 19 is a waveform diagram for describing an overall operation of a display apparatus according to the third embodiment of the present disclosure.

FIG. 17 is a first diagram illustrating a portion of an internal configuration of a controller for generating a signal based on a mode according to the third embodiment of the present disclosure, FIG. 18 is a second diagram illustrating a portion of an internal configuration of a controller for generating a signal based on a mode according to the third embodiment of the present disclosure, and FIG. 19 is a waveform diagram for describing an overall operation of a display apparatus according to the third embodiment of the present disclosure.

As illustrated in FIGS. 17 and 18, the controller may include a boost signal detector 210, a pixel position calculator 220 (e.g., pixel position calculator circuit), a boost mode data generator 230 (e.g., boost mode data generator circuit), a data generator 240 (e.g., data generator circuit), a data output unit 250 (e.g., data output circuit), and a pixel position selection signal generator 260 (e.g., pixel position selection signal generator circuit). Hereinafter, in order to help understand description, an example where the second driving mode is defined as the boost mode will be described.

The boost signal detector 210 may detect a boost signal BES applied from the outside, so as to determine whether there is a boost mode activation state or a boost mode deactivation state. The boost signal detector 210 may be omitted as in FIG. 18. In this case, the boost signal BES may be directly transferred to the boost mode data generator 230.

The pixel position calculator 220 may calculate a position value of a boost pixel so as to set a region (a boost mode application region) for applying the boost mode, based on a boost region signal BMA applied from the outside. In a display panel, a position of a region capable of operating in the boost mode may differ based on a vehicle. Accordingly, a region for applying the boost mode may be set based on the boost region signal BMA, thereby increasing a general-purpose characteristic.

The boost mode data generator 230 may operate when the boost mode is activated. When the boost mode is activated, the boost mode data generator 230 may generate a boost data signal corresponding to a region (a region where OLED1 and OLED2 included in a subpixel are simultaneously driven) which is to be operated in the boost mode, based on the position value of the boost pixel transferred from the pixel position calculator 220. The boost data signal may be generated so that luminance increases compared to a normal data signal (a data signal where the boost mode is not applied) generated in the normal mode. However, the boost mode data generator 230 may operate in a case which is for more increasing the visibility of a region which is to be operated in the boost mode.

The data generator 240 may add a boost data signal, transferred from the boost mode data generator 230, to a data signal DATA (a data signal applied under a normal mode condition) applied from the outside to generate a new data signal (a data signal including the normal mode and the boost mode). The new data signal (the data signal including the normal mode and the boost mode) may include a normal data signal applied to a region which operates in the normal mode and a boost data signal applied to a region which operates in the boost mode.

The data output unit 250 may output the new data signal generated by the data generator 240. The data output unit 250 may include a circuit for outputting or transferring the new data signal to the data driver 400. The data driver 400 may apply the new data signal through the data line of the display panel 100.

The pixel position selection signal generator 260 may generate a pixel position selection signal for selecting a position of the boost pixel, based on the position value of the boost pixel transferred from the pixel position calculator 220. The pixel position selection signal generator 260 may include a circuit for outputting or transferring the pixel position selection signal to the level shifter 350.

The level shifter 350 may generate a share signal and a privacy signal which are to be applied to the display panel 100, based on the pixel position selection signal transferred from the pixel position selection signal generator 260. The level shifter 350 may shift a level to a gate on voltage and a gate off voltage for turning on or off a switching transistor connected to a share signal line and a privacy signal line and may thus output a share signal and a privacy signal.

Hereinafter, an example where an automotive display apparatus operates in the boost mode will be described with reference to FIG. 19. However, FIG. 19 may be merely an embodiment for helping understand a boost mode operation, and embodiments of the present disclosure are not limited thereto.

As illustrated in FIGS. 1, 10, and 12 to 19, when a power of a vehicle is applied, an automotive display apparatus 10 may generate a vertical synchronization signal Vsync and may start driving. In this case, the vertical synchronization signal Vsync may be generated by the controller 200.

When a mode selection signal (Mode sel) applied from the outside is logic low L, the automotive display apparatus 10 may operate (control) a share region (Share mode), and when the mode selection signal (Mode sel) applied from the outside is logic high H, the automotive display apparatus 10 may operate (control) a privacy region (Privacy mode).

When a boost signal BES applied from the outside is shifted from logic low L to logic high H, the automotive display apparatus 10 may operate in the boost mode. When operating in the boost mode, the automotive display apparatus 10 may operate based on a new data signal DATAP and a pixel position selection signal PIXP.

The automotive display apparatus 10 may display an image on the display panel 100, based on a signal applied through a gate line like a first scan signal SCAN1, a second scan signal SCAN2, and an emission control signal EM and a signal applied through a signal line like a first direction privacy signal P_VS, a second direction privacy signal P_HS, a first direction share signal S_VS, and a second direction share signal S_HS.

The automotive display apparatus 10 may operate a selected region in the boost mode when the boost signal BES is applied to be logic low L, the first scan signal SCAN1, the second scan signal SCAN2, and the emission control signal EM are applied to be a low voltage L, and the first direction privacy signal P_VS, the second direction privacy signal P_HS, the first direction share signal S_VS, and the second direction share signal S_HS are applied to be a low voltage L. That is, the boost mode may start when the first direction privacy signal P_VS, the second direction privacy signal P_HS, the first direction share signal S_VS, and the second direction share signal S_HS are applied under the same voltage condition.

Hereinabove, the present disclosure may allow one or more light emitting devices selected from among at least two light emitting devices to emit light, based on a driving mode, and thus, may increase visibility in a specific situation. Also, the present disclosure may divide a driving current when at least two light emitting devices emit light and may thus implement high luminance and decease a stress applied to a device, thereby reducing a degradation and decreasing the degree of recognition of an afterimage. Also, the present disclosure may increase visibility and may decrease a degradiation when displaying information associated with the safety of a vehicle, thereby providing an automotive display apparatus capable of being implemented to enable a long lifetime.

The effects according to the present disclosure are not limited to the above examples, and other various effects may be included in the disclosure.

While the present disclosure has been particularly shown and described with reference to embodiments thereof, it will be understood by those of ordinary skill in the art that various changes in form and details may be made therein without departing from the spirit and scope of the present disclosure as defined by the following claims.

What is claimed is:

1. A display apparatus, comprising:

a subpixel including a driving transistor and at least two light emitting devices;

a display panel including a first display area and a second display area, each of the first display area and the second display area displaying an image based on light emitted from the subpixel; and a display panel driving circuit configured to drive the display panel, wherein the display panel operates in a first driving mode during which one of the at least two light emitting devices emit light, wherein the display panel operates in a second driving mode during which the at least two light emitting devices emit light, and wherein the subpixel comprises:

the driving transistor including a gate electrode connected to a first node of the subpixel, a first electrode connected to a second node of the subpixel, the second node connected to a high-level voltage line, and a second electrode connected to a third node of the subpixel;

a first switching transistor including a gate electrode connected to a first scan line, and a first electrode connected to a data line;

a capacitor including a first electrode connected to a second electrode of the first switching transistor, and a second electrode connected to the first node;

a second switching transistor including a gate electrode connected to a second scan line, a first electrode connected to the first node, and a second electrode connected to the third node;

a third switching transistor including a gate electrode connected to an emission control line, a first electrode connected to a reference voltage line, and a second electrode connected to the first electrode of the capacitor;

a fourth switching transistor including a gate electrode connected to the emission control line, and a first electrode connected to the third node;

a fifth switching transistor including a gate electrode connected to the second scan line, a first electrode connected to the reference voltage line, and a second electrode connected to an anode electrode of a first light emitting device of the at least two light emitting devices;

a sixth switching transistor including a gate electrode connected to the second scan line, a first electrode connected to the reference voltage line, and a second electrode connected to an anode electrode of a second light emitting device of the at least two light emitting devices;

a seventh switching transistor including a gate electrode connected to a first direction share signal line, a first electrode connected to a second electrode of the fourth switching transistor, and a second electrode connected to the anode electrode of the first light emitting device;

an eighth switching transistor including a gate electrode connected to a second direction share signal line, a first electrode connected to the second electrode of the fourth switching transistor, and a second electrode connected to the anode electrode of the first light emitting device;

a ninth switching transistor including a gate electrode connected to a second direction privacy signal line, and a first electrode connected to the second electrode of the fourth switching transistor; and a tenth switching transistor including a gate electrode connected to a first direction privacy signal line, a first electrode connected to a second electrode of the ninth switching transistor, and a second electrode connected to the anode electrode of the second light emitting device, wherein the first electrode of the eighth switching transistor is connected to the first electrode of the seventh switching transistor, and the second electrode of the eighth switching transistor is connected to the second electrode of the seventh switching transistor.

2. The display apparatus of claim 1, wherein the driving transistor generates driving current that is distributed to the at least two light emitting devices in the second driving mode.

3. The display apparatus of claim 2, wherein the second driving mode starts based on a share signal applied through a share signal line and a privacy signal applied through a privacy signal line.

4. The display apparatus of claim 3, wherein the display panel driving circuit comprises a level shifter circuit configured to output the share signal and the privacy signal.

5. The display apparatus of claim 1, wherein:

the seventh switching transistor is turned on based on a first direction share signal applied through the first direction share signal line;

the eighth switching transistor is turned on based on a second direction share signal applied through the second direction share signal line;

the ninth switching transistor is turned on based on a second direction privacy signal applied through the second direction privacy signal line; and the tenth switching transistor is turned on based on a first direction privacy signal applied through the first direction privacy signal line.

6. The display apparatus of claim 5, wherein the second driving mode starts when the first direction share signal, the second direction share signal, the second direction privacy signal, and the first direction privacy signal are applied under a same voltage condition.

7. The display apparatus of claim 5, wherein the first light emitting device is defined as a share light emitting device which enables all of a user of a first viewpoint and a user of a second viewpoint to see light emitted therefrom, and the second light emitting device is defined as a privacy light emitting device which enables only the user of the first viewpoint to see light emitted therefrom.

8. The display apparatus of claim 1, wherein the display panel driving circuit comprises a controller configured to generate, based on a first signal applied from outside of the controller, a second signal that drives the display panel in at least one of the first driving mode and the second driving mode, and the controller comprises:

a pixel position calculator circuit configured to calculate a position value of a boost pixel and set a region that operates in the second driving mode;

a boost mode data generator circuit configured to generate, based on the position value of the boost pixel, a boost data signal corresponding to a region that operates in a boost mode of the display panel; and a pixel position selection signal generator circuit configured to generate, based on the position value of the boost pixel, a pixel position selection signal that selects a position of the boost pixel.

9. The display apparatus of claim 8, wherein the display panel driving circuit comprises a level shifter circuit that outputs, based on the pixel position selection signal, a share signal applied through a share signal line and a privacy signal applied through a privacy signal line, each of the share signal line and the privacy signal line is connected to the subpixel.

10. The display apparatus of claim 8, wherein the boost data signal is generated so that luminance increases compared to a normal data signal generated in the first driving mode.

11. A method for driving the display apparatus of claim 1, the method comprising:

operating the display panel of the display apparatus in the first driving mode during which one of two light emitting devices included in the subpixel of the display panel emits light; and operating the display panel in the second driving mode different from the first driving mode during which the two light emitting devices included in the subpixel emit light based on the second driving mode which differs from the first driving mode, wherein operating the display panel in the second driving mode starts based on a share signal applied through the first direction share signal line and the second direction share signal line and based on a first direction privacy signal and a second direction privacy signal applied through a privacy signal line.

12. The method of claim 11, wherein operating the display panel in the second driving mode starts when the share signal, the first direction privacy signal and the second direction privacy signal are applied under a same voltage condition.

* * * * *